US012809880B2

(12) United States Patent
Farr et al.

(10) Patent No.: US 12,809,880 B2
(45) Date of Patent: Nov. 24, 2026

(54) SYSTEMS AND METHODS FOR INTERACTION GOVERNANCE WITH ARTIFICIAL INTELLIGENCE

(71) Applicant: TDAA Technologies Corp, Colorado Springs, CO (US)

(72) Inventors: Jon Eric Farr, Colorado Springs, CO (US); Andrew McKennie Curran, Greenfield, MA (US); Sandy Robert Friedman, Rancho Santa Margarita, CA (US)

(73) Assignee: TDAA Technologies Corp, Colorado Springs, CO (US)

( * ) Notice: Subject to any disclaimer, the term of this patent is extended or adjusted under 35 U.S.C. 154(b) by 0 days.

(21) Appl. No.: 19/033,072

(22) Filed: Jan. 21, 2025

(65) Prior Publication Data

US 2025/0238427 A1 Jul. 24, 2025

Related U.S. Application Data

(63) Continuation-in-part of application No. 18/907,320, filed on Oct. 4, 2024.

(Continued)

(51) Int. Cl.

| | |
|---|---|
| ***G06F 16/00*** | (2019.01) |
| ***G06F 16/11*** | (2019.01) |
| ***G06F 16/2457*** | (2019.01) |
| ***G06F 16/248*** | (2019.01) |
| ***G06F 16/903*** | (2019.01) |
| ***G06F 16/9032*** | (2019.01) |

(52) U.S. Cl.

CPC .......... *G06F 16/248* (2019.01); *G06F 16/122* (2019.01); *G06F 16/24575* (2019.01); *G06F 16/9032* (2019.01); *G06F 16/90335* (2019.01)

(58) Field of Classification Search

CPC ............ G06F 16/248; G06F 16/24575; G06F 16/90335; G06F 16/9032; G06F 16/122

(Continued)

(56) References Cited

U.S. PATENT DOCUMENTS

2007/0011183 A1 1/2007 Langseth et al.
2012/0054249 A1 3/2012 Batra et al.

(Continued)

OTHER PUBLICATIONS

International Search Report and Written Opinion, mailed Dec. 5, 2024 for International Application No. PCT/US2024/049934.

(Continued)

*Primary Examiner* — Chelcie L Daye
(74) *Attorney, Agent, or Firm* — Wolf, Greenfield & Sacks, PC

(57) ABSTRACT

Systems and methods are provided to facilitate user interaction with AI models. For example, guided sessions turn user requests into workflow steps, that enable optimization at each step. In other aspects, an interaction layer or component can be configured to manage interactions with AI models that are tailored to the requesting user (e.g., via curation agents or components) or tailored to a context identified during an interactive session. These interactive/guided sessions expand on the functionality to account for and/or encompass perspectives associated with source and/or generated content. Many AI models are known to be biased among other issues. The system can manage bias using context information. Leveraging context information, the system provides insight and associated context to eliminate the bias from outputs returned, and/or even enhance the bias of outputs returned as desired, among other options. AI models can be provided as curators having specific characteristics that constrain outputs.

20 Claims, 21 Drawing Sheets

Related U.S. Application Data

(60) Provisional application No. 63/623,479, filed on Jan. 22, 2024, provisional application No. 63/623,462, filed on Jan. 22, 2024, provisional application No. 63/588,451, filed on Oct. 6, 2023, provisional application No. 63/588,444, filed on Oct. 6, 2023, provisional application No. 63/588,421, filed on Oct. 6, 2023.

(58) Field of Classification Search
USPC .................................................. 707/722, 705
See application file for complete search history.

(56) References Cited

U.S. PATENT DOCUMENTS

| | | | |
|---|---|---|---|
| 2012/0239609 A1 | 9/2012 | Zhao et al. | |
| 2016/0018962 A1 | 1/2016 | Low et al. | |
| 2017/0116305 A1 | 4/2017 | Kapoor et al. | |
| 2021/0081498 A1* | 3/2021 | Goslin | A63F 13/822 |
| 2021/0193297 A1 | 6/2021 | Buckland et al. | |
| 2022/0263783 A1 | 8/2022 | Jang | |
| 2023/0297771 A1 | 9/2023 | Peleg et al. | |
| 2023/0297914 A1* | 9/2023 | Hatfield | G06Q 10/06395 705/7.27 |
| 2023/0385085 A1 | 11/2023 | Singh | |
| 2023/0394333 A1 | 12/2023 | Jiao et al. | |
| 2024/0281410 A1* | 8/2024 | Williams | G06F 16/122 |
| 2024/0346256 A1* | 10/2024 | Qin | G06F 40/35 |
| 2024/0412135 A1 | 12/2024 | Stavarache et al. | |
| 2025/0117432 A1 | 4/2025 | Curran et al. | |

OTHER PUBLICATIONS

International Search Report and Written Opinion, mailed Mar. 21, 2025 for International Application No. PCT/US2025/012421.

International Preliminary Report on Patentability, mailed Apr. 16, 2026, for Application No. PCT/US2024/049934.

* cited by examiner

| | |
|---|---|
| Recursion | Creates an interactive loop inside a chat session on top of the chat context object. Allows for continuous user input and refactoring and system autonomy |
| Builder | Creates and constructs formatted blocks such as code, configuration, prompts |
| Configuration | Configuration |
| Instructional | Creates an feedback loop with a specific list on instructions to complete a task, on each submission the list is refactored based on the appropriate context |
| Feedback | Creates an feedback loop based on user input, returns a summary of improvements for the task list to help generate better results on each iteration or submission |
| Resolution | Validates TDAA data returned from chat agent against local and/or external indexes/dictionaries/vectors and assigns a weight to each result, responses are filtered and ordered and returned for further processing. |
| Tasking | Tasking |
| Cleansing | Normalizes/ standardizes data values and structures and supports pre defined and custom data formats eg. FDA, USMTF, SOX, etc. Fixes spelling grammar and cleanses results while minimizing token count. |

FIG. 11

SYSTEMS AND METHODS FOR INTERACTION GOVERNANCE WITH ARTIFICIAL INTELLIGENCE

RELATED APPLICATIONS

This Application claims priority under 35 USC 119(e) as a Non Provisional of Provisional U.S. Application Ser. No. 63/623,462, Filed Jan. 22, 2024, entitled “SYSTEMS AND METHODS FOR INTERACTION GOVERNANCE WITH ARTIFICIAL INTELLIGENCE”. This Application claims priority under 35 USC 119(e) as a Non Provisional of Provisional U.S. Application Ser. No. 63/623,479, Filed Jan. 22, 2024, entitled “SYSTEMS AND METHODS FOR INTERACTION GOVERNANCE WITH ARTIFICIAL INTELLIGENCE”. This Application claims priority under 35 USC 120 as a Continuation in Part of U.S. application Ser. No. 18/907,320, Filed Oct. 4, 2024, entitled “SYSTEMS AND METHODS FOR DATABASE MANAGEMENT INTEGRATING AI WORKFLOWS”, which claims priority under 35 USC 119(e) as a Non-Provisional of Provisional U.S. Application Ser. No. 63/588,444, filed Oct. 6, 2023, entitled “SYSTEMS AND METHODS FOR REDUCING HALLUCINATION IN GENERATIVE AI AND LARGE LANGUAGE MODELS”. application Ser. No. 18/907,320 claims priority under 35 USC 119(e) as a Non-Provisional of Provisional U.S. Application Ser. No. 63/588,451, filed Oct. 6, 2023, entitled “SYSTEMS AND METHODS FOR REDUCING HALLUCINATION IN GENERATIVE AI AND LARGE LANGUAGE MODELS”. application Ser. No. 18/907,320 claims priority under 35 USC 119(e) as a Non-Provisional of Provisional U.S. Application Ser. No. 63/588,421, filed Oct. 6, 2023, entitled “SYSTEMS AND METHODS FOR DATA MANAGEMENT USING AI WORKFLOWS”. application Ser. No. 18/907,320 claims priority under 35 USC 119(e) as a Non-Provisional of Provisional U.S. Application Ser. No. 63/623,462, filed Jan. 22, 2024, entitled “SYSTEMS AND METHODS FOR INTERACTION GOVERNANCE WITH ARTIFICIAL INTELLIGENCE”. application Ser. No. 18/907,320 claims priority under 35 USC 119(e) as a Non-Provisional of Provisional U.S. Application Ser. No. 63/623,479, filed Jan. 22, 2024, entitled “SYSTEMS AND METHODS FOR INTERACTION GOVERNANCE WITH ARTIFICIAL INTELLIGENCE”. Each of which applications are hereby incorporated by reference in their entirety.

BACKGROUND

Artificial intelligence and more specifically generative artificial intelligence (“GAI”) has become more prevalent, efficient, and accurate. For example, GAI is being used for building conversational outputs based on predicting what words or groups of words should be output in response to user inputs. Large language models (“LLM”) are now available that provide conversational outputs in response to natural language inputs via a prompt interface. The well-known CHATGPT is one example. Other well-known models generate content based on user requests, including, original artwork, music, images, etc. For Open AI’s DALL-E and CHATGPT programs, Stability AI’s Stable Diffusion program, and Midjourney’s self-titled program—are able to generate new images, texts, and other content (or “outputs”) in response to a user’s textual prompts (or “inputs”). There are known problems with the outputs generated from such systems. For example, a given model can only function based on training data. A response/output cannot encompass information the model does not have accurately. Further, the outputs may not be accurate and may even be fabricated (“hallucinated”) while having the appearance of accuracy.

SUMMARY

The inventors have realized that characterizing only wrong predictions as hallucinations has obscured the fact that all the outputs generated by AI models are predictions that may only happen to be correct. The AI model itself has no intrinsic understanding of “correct” or “incorrect.” Nor does the model have intrinsic understanding of the sources used to build such outputs. The focus on hallucinations has led to over investment in model development, model training, and even prompt engineering as single solutions to the hallucination problem. Further, the source attribution problem remains largely ignored or overlooked in conventional implementation. The inventors have realized that a model-agnostic, interaction-design-oriented approach provides implementation required to improve over conventional solutions and provides a path for solving the hallucination problem. According to one aspect, various embodiments facilitate user interaction with AI models via guided sessions. The guided sessions turn user requests into workflow steps, that enable optimization at each step. In other aspects, an interaction layer or component can be configured to manage interactions with AI models that are tailored to the requesting user (e.g., via curation agents or components) or tailored to a context identified during an interactive session.

According to some embodiments, the interactive session expands on the functionality described herein with respect to the guided session and enables the system to account for and/or encompass perspectives associated with source and/or generated content. For example, many AI models are known to be biased, for example, as a result of the source data used to create the models. In some embodiments, the system is configured to manage bias as context information that can be encoded with use of such content in a model. The system can leverage the context information to provide insight and associated context (e.g., identify source having bias), to potentially eliminate the bias from outputs returned, and/or enhance the bias of outputs returned, among other options. For example, the system can enable selection of curators having specific characteristics or preferences, and upon selection use those preferences to select an AI model reflecting those characteristics, generate prompt inputs reflecting those characteristics, among other options.

In further examples, the system can include multiple versions of content that are transformed into embeddings using different models, and/or provide context information for the embedding generation, in addition to or separately from context information associated with the content. In some embodiments, selections of context or perspective can be made as part of a search (e.g., based on selecting content, analysts, embedding models, among other options), as part of creation of a content catalog from one or more searches, and as part of the creation of new generative works from the content or content catalog. The inventors have realized that giving users insight into how content is processed into embeddings that are used by AI provides functionality and enables understanding not available in conventional systems.

More generally, the interactive session permits users (or the system) to tailor interactions with AI models to include specific contexts. For example, a user can select from a plurality of contexts (e.g., curation context, librarian context, etc.) that focus AI output according to specific preferences. The preferences can be associated with specific content creators (e.g., critical writing sources), that can be used to modify, adapt, or augment user prompts or inputs provided to an AI model. In some examples, the context modifications can extend into and optimize workflow creation during guided sessions.

In other embodiments, the contexts can be used to fine tune AI models or re-train AI models. The fine tuning or re-training can include filtering of training data to specific contexts and yielding a plurality of models each tailored to specific context. The system can present an opportunity to select contextually specific models and their associated characteristics (e.g., includes author, excludes author, includes critical analysis by content creator, generates images influenced by content creator, excludes content by content creator, etc.) during interactive sessions among other options. In some embodiments, the interaction layer or component is configured to maintain attribution meta-data on content contributors to the various models and maintain attribution information for the body of training data as new models are generated or fine-tuned. Maintaining attribution for content contributors for each context enables functionality unavailable in conventional implementation, including facilitation of leveraging attribution when AI models produce an output.

Additionally, the training data itself poses issues in the context of conventional AI implementation. For example, there are a substantial number of documents which users and LLMs would likely want to draw on which overlap across all applications. Having each of these users separately and individually try to organize and store these documents is inefficient and resource intensive, as well as leading to less standardization across the field in terms of optimal organization of material for AI retrieval.

These issues are fundamental to Generative AI/LLMs and are related to how they function. For example, "embedding" of words in a vector store arranges words semantically based on the likelihood or frequency with which they occur alongside each other or together in the model's training data. The logic which often governs this process is passive and constructed from the training data itself. When these embedding models are not built with intention, they invariably embody the biases of society since they are simply a collection of English language text. This "baseline" perspective problem is a function of the mistaken assumption that researchers and technologists can achieve an "objective" embedding perspective. Failing to acknowledge that all perspectives are a perspective, impacts not just embedding models, but all LLMs. The extent to which these impacts are evident in outputs are currently under-appreciated in the field and even ignored in many conventional implementations. By enabling the system and/or users to integrate context into model interaction/development, the system improves over known approaches by tailoring predicted outputs to specific contexts, and can also teach how specific characteristics selected as context impact predictions by AI models. For example, integrating context into foundational elements of large language model design, development, and use improves accuracy, improves predictive output targeting, and can in some examples enable users and/or the system to improve refinements on the interactive approach as well as refinements on AI models.

Some embodiments leverage abstract data models and/or knowledge graphs to give LLMs a "map" to navigate a source (e.g., content) library, similar to a card catalog. The abstract data models and/or knowledge graph enables the system to build on context to avoid the conventional problem of "starting from scratch" with each model (e.g., vectorized database).

Various aspects of an interaction governance approach utilize the interaction design as a focal point that can also leverage model refinement and/or prompt engineering to provide a holistic solution that improves AI model output accuracy, alignment with user targets or goals, and reduces error returned in prediction for any model and for any context.

According to one example, the inventors have realized generating step wise interactions with LLM and GAI provides opportunities to improve the accuracy of any responses produced, including, for example, conversational responses. Further, user interfaces can be tailored to display data management operations, original user queries, and/or user requests as a series of workflow steps, based on requesting that an AI model define a series of steps for a respective task, request, input, and/or query. The system is configured to optimize a final output/result based on a step-by-step workflow generated by AI models. For example, each step of the workflow can be used as an input to an LLM, and can also include prompt based optimizations at each workflow step, improving their accuracy over conventional implementation. The workflow's step-by-step optimization can also be used to train or optimize existing AI models, including for example, LLM models, improving their accuracy over conventional approaches. Various embodiments implement a step-by-step AI output generation approach that reduces hallucination of conventional AI models, improving the underlying model, accuracy of outputs, and/or management of user interactions over known solutions.

According to one aspect, a system is provided. The system comprises at least one processor operatively connected to a memory, the at least one processor when executing configured to display an interactive session for managing interaction with at least a first AI model, accept a user input specifying at least some of a request to be processed by the first AI model, accept definition of a context to evaluate or constrain output produced by the first AI model, generate a modification or update or augmentation of an input to the first AI model based on context information associated with the specified context or select a version of the first AI model associated with the specified context or select a curator agent associated with the specified context, and optimize generation of a final output of the first AI model to communicate and present in a user interface displaying the interactive session.

According to one embodiment, the at least one processor is configured to display, as part of the interactive session, information describing the context selected which can optionally include display options for available contexts that modify outputs produced by the first AI model. According to one embodiment, the at least one processor is configured to display a plurality of default contexts (e.g., selectable curators, academic curator, popular curator, artistic curator, etc.) and description of an effect on the returned output each respective default induces. According to one embodiment, the at least one processor is configured to display a plurality of outputs associated with the user input specifying at least some of the request, each output associated with a respective context, description of the context, in displays for evaluating empirically changes in output based on the described context. According to one embodiment, the at least one processor is configured to accept a user input specifying the context. According to one embodiment, the at least one processor is configured to automatically define the context.

According to one embodiment, the at least one processor is configured to generate workflow steps as part of the generation of the final output of the first AI model to communicate and present in the user interface displaying the interactive session. According to one embodiment, the at least one processor is configured to modify or update or augment creation of respective workflow steps based at least in part on the context. According to one embodiment, the at least one processor is configured to modify or update or augment creation of respective workflow steps based at least in part on the context by generating additional inputs to any AI model configured to generate the respective workflow steps.

According to one aspect, a computer implemented method is provided. The method comprises displaying, by at least one processor, an interactive session for managing interaction with at least a first AI model, accepting, by the at least one processor, a user input specifying at least some of a request to be processed by the first AI model, accepting, by the at least one processor definition of a context to evaluate or constrain output produced by the first AI model, generate a modification or update or augmentation of an input to the first AI model based on context information associated with the specified context or select a version of the first AI model associated with the specified context or select a curator agent associated with the specified context, and optimize generation of a final output of the first AI model to communicate and present in a user interface displaying the interactive session.

According to one embodiment, the method comprises displaying, as part of the interactive session, information describing the context selected which can optionally include display options for available contexts that modify outputs produced by the first AI model. According to one embodiment, the at least one processor is configured to display a plurality of default contexts (e.g., selectable curators, academic curator, popular curator, artistic curator, etc.) and description of an effect on the returned output each respective default induces. According to one embodiment, the method comprises displaying a plurality of outputs associated with the user input specifying at least some of the request, each output associated with a respective context, description of the context, in displays for evaluating empirically changes in output based on the described context. According to one embodiment, the method comprises accepting a user input specifying the context. According to one embodiment, the method comprises automatically defining automatically, the context. According to one embodiment, the method comprises generating workflow steps as part of the generation of the final output of the first AI model, and presenting the workflow steps and associated outputs in the user interface displaying the interactive session.

According to one embodiment, the method comprises modifying or updating or augmenting creation of respective workflow steps based at least in part on the context. According to one embodiment, the method comprises modifying or updating or augmenting creation of respective workflow steps based at least in part on the context by generating additional inputs to any AI model configured to generate the respective workflow steps. According to one embodiment, further comprises: display an interactive session for managing ingestion of content into a first source, accept definition specifying at least some characteristics of the content, generate graph based data reflecting association(s) between respective content and the at least some characteristics of the content, enable selection of the at least some characteristics to identify constraints for producing content related outputs via a second AI model, and responsive to selection of the at least some characteristics generate a constrained set of outputs relative to outputs produced by an unconstrained interaction with the first AI model. According to one embodiment, the at least one processor is configured to accept user selection of the at least some characteristics.

According to one embodiment, the at least one processor is configured to accept the at least some characteristics that are automatically defined by the system. According to one embodiment, the at least one processor is configured to traverse the graph based data and identify related content have similar or matching properties defined by the at least some characteristics. According to one embodiment, the at least one processor is configured to instantiate a commentary AI model trained to accept content as input and output context information for the input content. According to one aspect, a computer implemented method comprises generating and displaying, by at least one processor, an interactive session for managing ingestion of content into a first source, accept definition specifying at least some characteristics of the content, generating graph based data reflecting association(s) between respective content and the at least some characteristics of the content, enable selection of the at least some characteristics to identify constraints for producing content related outputs via a first AI model, and responsive to selection of the at least some characteristics generate a constrained set of outputs relative to outputs produced by an unconstrained interaction with the first AI model. According to one embodiment, the method comprises accepting user selection of the at least some characteristics. According to one embodiment, the method comprises accepting the at least some characteristics that are automatically defined by the system.

According to one embodiment, the method comprises traversing the graph based data and identifying related content have similar or matching properties defined by the at least some characteristics. According to one embodiment, the method comprises instantiating a commentary AI model trained to accept content as input and output context information for the input content.

Other advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to “an example,” “some examples,” “an alternate example,” “various examples,” “one example,” “at least one example,” “this and other examples” or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 11 illustrates example logic blocks that can be implemented in various embodiments;

DETAILED DESCRIPTION

Figure 1:
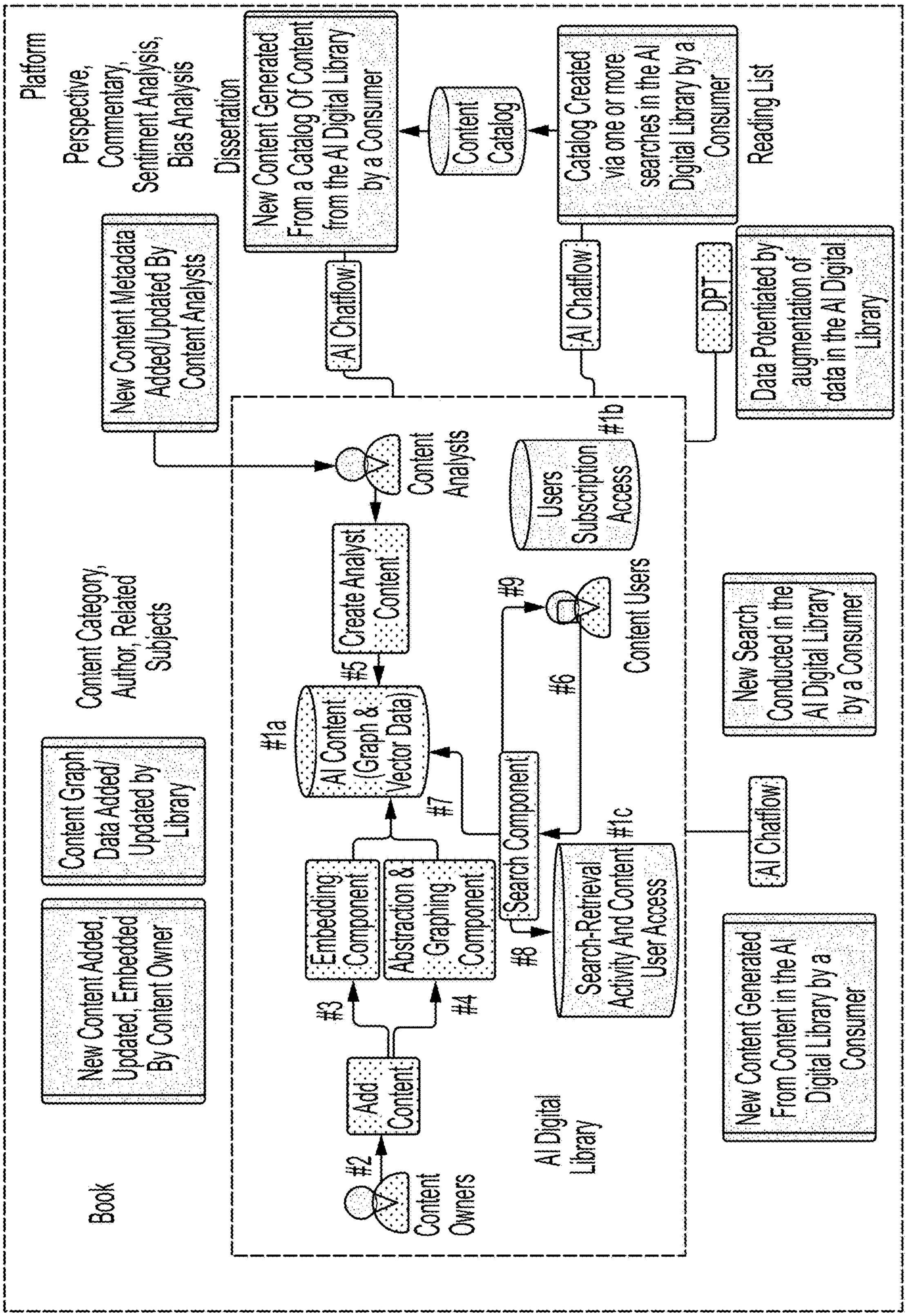
FIG. 1 is a block diagram and process flow showing an example implementation, according to one embodiment.

According to various embodiments, an AI workflow system can provide core functionality configured to manage interactions between end users (and, for example, their associated systems) and generative AI services (e.g., that manage data transformation, normalization, obfuscation, data validation/cleansing, and/or anonymization). According to one aspect, an interaction layer or interaction component can provide enhanced functionality to enable users and/or the system to leverage context in interactions with the AI services. In some examples, the context provides access to content perspectives that produced or are integrated into the content being used by the model or being analyzed by the model.

Further aspects include construction and use of a digital library. Various embodiments of the digital library contain information on source content including, for example, embedding models used to transform content into formats adapted to AI processing. The digital library can contain and develop additional information that provides attribution for content, attribution for generated content, identification of perspective (e.g., bias, commentary, commentary, sentiment associated with content, sentiment associated with commentary and/or commentators, among other options). Interaction agents can leverage the information stored in the digital library (e.g., produced, captured, or used during various interactions on content) to build relationship information, build context, and build perspective. Such implementation yields improvement in targeting and outputs returned by various AI models. Further embodiments, enable fine-tuning, full re-training, generation of new AI models that encompass any part, combination, or the entirety of the information from the digital library.

Language models are based on generating language tokens so the manner in which knowledge is embedded can directly correlate with an LLM's understanding of what it is producing as output or what the model is analyzing in response to a request. In a sense this is like translation, where knowledge must be converted into "token." In view of serious limitations with conventional embedding models and (e.g., lack of) perspectives, this can be analogized to issues found in the field of translation. In the field of translation, bringing something from one language to another is as much art as science, many different translations of a book can comfortably coexist alongside each other, with the translator making their own decisions about how best to articulate a thought or feeling in the source language to the translated one. Phrases or idioms do not always have exact or literal translations available, so translators become interpreters. This is also true of both embedding model logic and the LLM's generated output as well. Various aspects of the system are implemented with the recognition that these tools (AI models) are interpretive rather than literal or indexical. With this understanding various embodiments are configured to account for and/or provide information on context (including for example perspective of a content author, commentator, artist, programmer, performer, etc.) to allow users to at least understand the effects such characteristics have on AI output, but also to leverage such context to improve output accuracy and/or alignment.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of “including,” “comprising,” “having,” “containing,” “involving,” and variations thereof is meant to encompass the items listed thereafter and equivalents thereof as well as additional items. References to “or” may be construed as inclusive so that any terms described using “or” may indicate any of a single, more than one, and all of the described terms.

FIG. 1 shows a system and process flow for interaction governance with AI models. Interaction in this context includes embedding creation from content sources, as well as interactions with AI models that used or are trained on the embeddings. Embedding creation reflects the translation from source content into a format adapted to use by AI models (e.g., LLM). Various embodiments of the system are configured to resolve any or one more or combination of: attribution issues associated with content use and integration into various AI models, including generative AI models (e.g., by encoding and associating attribution metadata with models); augment content to emphasize or surface contextual information based on encoding context metadata with content (e.g., perspective, sentiment associated with content, respect of community, evaluation information which can be further segregated (and selectable) on source (e.g., academic, academic reputation, amateur, community reputation, popularity (e.g., and time frame), among a host of details associated with varied perspectives content consumers can entertain); issues with approaches for embedding creation or vectorization of content to be used by models; issue in failing to incorporate content analysts into content use and/or incorporation into AI models (e.g., where the content analyst can itself be provided via AI model, provided by capture user analysis of content, provides by tracking user interactions with AI inputs, workflow steps/feedback, etc.); issues with allocating usage values for content contributors/owners in generating AI output; among other options.

According to some embodiment, the system can include a variety of databases to support the interaction governance with AI model functionality (e.g., shown at 1A, 1B, and 1C, FIG. 1). In some examples, a host of different architectures can be used in the respective databases. In one embodiment, a system can include a variety of data architectures including graph, vector, No SQL, dynamic schema, and/or relational architectures. The databases are configured to store several types of data. In one example, the database(s) are configured to manage access rights/permission and include information on users who are authorized to add, analyze, search, or retrieve content. The access rights can be based on subscription models that define access the respective user has been assigned. In further example, the database(s) can be configured to store raw data such as text, images, audio, or video that was used as a source for generation of embedding.

The embeddings can be stored in a vector format (e.g., in a separate database tailored for vector data). The database(s) are configured to store context or other abstract metadata for each piece of content provided to the system. For example, maintaining context and attribution metadata enables capture and use of relationship information between the content and other pieces of content stored in the library. In some examples, each piece of content is stored along with all of the subsections and versions that make use of it. Data or content subsections can be defined based on similarity, perspective, reputation, esteem, respect of source, etc. Further specific model versions can incorporate subsets of the content, and model versions can be defined on incorporation of specific sets of content incorporating a specific perspective (as well as the preceding options for subsections). In various embodiments, the subsections and/or versions are given their own identifier-which can then be used in content utilization tracking as well and in interaction processing.

In some embodiments, the system defines content subsections as chapter summaries or abstracts that are created by the content owner or in conjunction with ingestion of content to the digital library. Librarian agents can facilitate ingestion of content into the digital library, and in some examples, employ generative AI models to construct multiple versions of a content source, multiple versions of summaries or abstracts, each version reflecting and/or associated with perspective information. For example, a librarian's generative capabilities can be employed automatically by the system to generate multiple versions of the content, where each version represents specific context or perspective, and may include, for example, versions based on the embedding model used to transform the original content into embeddings or vector data.

The database(s) can also be configured to capture and store analysis and feedback provided by other users for individual pieces of content. In some embodiments, workflow interaction including user feedback and/or commentary on individual steps and outputs can likewise be captured as analysis information and incorporated into context data. In various settings. the database(s) are configured to store the activity of users based on whether they are adding, searching, retrieving, or analyzing content. This context associated with the user activity can be used in the utilization, access, and compensation process, among other options.

As shown the databases can include an AI content (e.g., graph based and/or vector data) database 1A. As shown at step 2, content providers can actively submit their or other content to the system. The submitted content can be transformed (step 3) into embedding information for use in and with respective AI models. The process can be bifurcated (step 4) where context information is captured and associated with content (and, for example, embeddings). For example, the context information can include attribution data and/or perspective information, among other options. Graph based data can be used by the system to capture and store connection information between content, attribution, and/or any context information (including for example perspective). In other examples, the context information can be transformed into embeddings, associated with content, and stored in the AI Content database 1A.

In conjunction (or separately) with content submission and encoding, context information can also be generated by content analyst users (step #5). In some examples, the content information reflects information generated by analyst users, and can include perspective, commentary, sentiment analysis, bias analysis, influenced by analysis, among other options. In other embodiments, content analysis AI models can be invoked to perform the content analyst user function (e.g., at step #5) to provide information on perspective, provide commentary, provide influenced by analysis, provide sentiment analysis, and/or provide bias analysis. Other analysis can include searches for existing commentary on respective content (e.g., academic community views content as reputable, has been peer reviewed, viewed as untrustworthy, misinformation, etc.), that can be incorporated as general context information. Users or models can be used to perform the analyst functions, and may be used together, or as validation of respective context information. In some examples, the system is configured to require context information be validated (at least one review/analysis confirmed by at least a second review/analysis).

Returning to step 4, the abstract metadata is captured and stored to enable AI operations to leverage defined relationships between content. In one example, the abstract metadata is used by the system to improve any search process for content (or generation process), where potentially responsive content can be filtered, added, and/or modified based on connected information. In further examples, the abstract metadata can be used to connect content or information based on sharing similar characteristics (e.g., context), similar categories, and/or similarity in other available information. Further operations can be used to exclude dissimilar or disfavored content/information when producing AI responses. In one example, search operations performed can leverage linked information to identify content disfavored by the searching user, exclude that content, and by virtue of connection between disfavored content/information, exclude further content options that would otherwise be returned. Various embodiments can include operations to validate a user's access to information in the digital library. In further embodiments, access can be managed or controlled based on specific content, perspective, commentator, and/or with respect to any information maintained in the digital library (e.g., included in database 1B).

The search and retrieval processing is shown in FIG. 1 at steps #6-9, and such search and retrieval activity can be captured and stored in database 1C. As an initial step, subscription information for users accessing the system can be retrieved from database 1B, to determine authorization and/or access restriction for respective content users (step #6). Once authorized, users can search and/or generate content by interacting with AI models conducting operations on content (e.g., stored in database 1A and/or in further example available via publicly accessible sources). Information on search-retrieval activity (and in further example, request-content generation activity) and content user access can be stored in the database #1C, and where the activity information provides information on perspective, that information can also be incorporated into context information (e.g., stored as relationship data, perspective data, sentiment information, bias information, etc.). For example, similarity between users can be leveraged by the system to provide content or perspective based on similar searches and/or outputs.

According to various embodiments. based on a user request, a search component is configured to search and scan available content which includes context metadata (e.g., content identifiers) as part of the search results. The resulting identifiers returned as part of the search that produces an output are stored in the database #1C and include the identifier of the user who requested the search in addition to the identifiers of the content searched. The returned data can be used in subsequent operations as part of attribution, context analysis, among other options. In one example, the attribution information is tracked and managed to ensure content providers can be appropriately linked to usage of their material. In one example, this allows the system to compensate such content providers according to usage information-such functionality is lacking in many conventional approaches.

Further embodiments can include additional tracking functionality. For example, the system can be configured to capture information on a type of search. According to one embodiment, the system is configured to classify when the search is for the purpose of finding available content based on context or content characteristics. For example, a search that covers metadate to identify content falls into this class. In another embodiment, the system is configured to classify when the search is returning embedded content. For example, a search that returns content from the library would be in this class. The system can use such information when determining use and/or compensation required for content access. For example, searches through metadata are tracked but not counted in the context of some use based compensation models (e.g., not used for compensation or attribution). In one example, if a search is returning embedded content, then the system can be configured to track that type of search and determine attribution of any content returned as part of an example compensation model that results in use based accounting for the content owner.

The inner dashed boundary shown in FIG. 1 is a logical outline of the AI library and functions that can be leveraged by various platform components (outer dashed line). For example, the library architecture and functionality can support AI chat flow interactions with AI content and/or AI models built on the associated content. In some examples, the context in which a user interacts with the AI chat flow can be used to determine an output of the AI chat flow. For example, content generation can encompass a specific catalog of sources specified by the user that filters the content available in the AI library prior to generating an output or to filter an output generated. In one example, the user can request the AI chat flow to produce a dissertation on a specific topic, and produce the dissertation based on sources having a respected opinion in the field and a PhD level of education. In some examples, this can be accomplished via an AI model specifically tailored to those criteria and generated by the library based on context metadata, or via prompt inputs the system creates based on a user selected curator agent (e.g., having specified characteristics (e.g., community sentiment—respected, academic sentiment—respected, and education level—PhD)). The resulting prompt can be generated by the system automatically in response to selection of a curator, so the input of "generate a dissertation on subject," returns only the specifically matching outputs without the user needing to understand how to generate or provide such prompts.

Other AI chat flows may build results that form reading lists according to their preferences. The system can generate curators that are based on those reading lists. For example, these curators represent that reading list, its properties, and content (e.g., including perspective, bias, sentiment, etc.). The curator can then become a selectable option presented to a user in an interactive session that controls outputs returned that match the perspective, bias, sentiment, etc. that generated the reading list. These groupings (and curator agents) become an element akin to catalog of available content, and each such curator can be used to provide context according to respective catalogs.

Incorporation of context, attribution, and relationship information when interacting with AI solves a host of issues in conventional approaches. According to one embodiment, incorporation of content is subject to the problem of copyrighted works being used in the AI technology space without permission or attribution. The system can generate an AI digital library that allows copyright holders to submit their works to be incorporated (e.g., transformed into embedding), stored, searched, and retrieved for use with other AI technologies that captures and records the user activity of such usage. In various embodiments, the system capability to track usage (e.g., by maintaining attribution throughout any subsequent model use) enables the system to manage attribution to, and compensation of, content contributors (e.g., copyright holders).

In some examples, the AI digital library is configured to support the storage of copyrighted content by augmenting various known embedding methods and models (e.g., such as text-embedding-ada-002), and also is configured to incorporate development and use of other/future embedding methods and models. The system is configured to store and manage embeddings (e.g., translated content) such that it is not dependent on a particular embedding approach. For example, the system is configured to incorporate "Socratic Friction" embedding methodologies where content embedding creation includes context creation and encoding. As discussed herein, context creation and/or encoding make the 'perspective' inherent in content available and selectable by users interacting with such augmented AI. In other words, any perspective encompassed in a particular piece of content is surfaced via an interactive session (e.g., by displaying context characteristics, by selecting a curator having context filters, etc.), making any perspective transparent to the user.

In further embodiments, the library (repository of embeddings and/or context associations) is configured to support the storage of data using various database technologies including relational, NoSQL, graph, and vector architectures. In further embodiments, the AI digital library is configured to allow for the ability to store additional metadata for each copyrighted work submitted by content analysts to provide commentary, sentiment analysis, and other data that articulates their unique perspectives. In one example, this context metadata can likewise be encoded as embeddings and integrated directly into models. Multiple model versions can be made accessible, and can be selected based on identified preferences during interactive sessions, among other examples. In various embodiments, the additional metadata can be used by users to search for content or to augment the process of prompt generation/architecture in use with LLMs. Stated broadly, the digital library becomes a holistic and comprehensive source that allows users to search, generate, and retrieve content for use in conjunction with a variety of AI technologies and architectures. In various examples, the context information captured, created, and/or encodes is tailored to use with large language models.

The AI digital library will track the user activity based on the search and retrieval of specific copyrighted works and store the unique identifiers of each work retrieved along with the user who accessed them. The addition of user characteristics and their interaction with AI generated outputs (as well as user characteristics and interaction with workflow steps-discussed in greater detail below) provide additional context information for use. The additional context information can be used to build curators having similar characteristics as the users they are derived from, or to build prompt inputs that achieve improved targeting of AI output over conventional approaches. In still other embodiments, this unique data enables the system to provide attribution for any copyright holder that participated in creation of any new work by AI technology that was based on use of the copyright holders' content. In other examples, this data provides the system with the ability to identify usages for any operation, unlike conventional approaches. In some settings, the system can leverage the identified usage information into compensation modeling for content providers (e.g., the copyright holder) resulting from use of their copyrighted work in the AI model that produced a new work or usage.

Example System/User AI Interaction Functionality

According to various embodiments, an AI workflow system is configured to manage interactions between end users (and, for example, their associated systems) and generative AI services. Various embodiments improve interactions with AI starting with the most basic level, encoding of content for use by AI models. For example, encoding perspective information as part of processing content provides enhanced interaction functionality over conventional approaches. In some examples, the system can leverage AI models that are trained to find context (e.g., perspective) information on content sources or content generators (e.g., books, translations, authors, artists, performers, etc.), and provide context metadata that is encoded and produced with processing content. In another example, AI models can be trained and given prompts to capture and/or generate context metadata for a content source. Further attribution metadata can likewise be captured and associated with a content source. As discussed above, the attribution information can solve many conventional issues associated with the use and/or incorporation of content into AI models, and can even be used as context information for informing subsequent interactions (e.g., between users and AI models and/or between automated system functions and AI models, among other options).

In various embodiments, the AI workflow system is configured to host an interactive session for any end user or system. The interactive session is configured to accept a user input that is provided to produce a responsive AI output. For example, the AI workflow system is configured to manage user interaction with a large language model ("LLM") trained to produce conversational output in response to user input or queries. In an example session, a user may enter a query or request into a user interface provided by the system. Responsive to accepting the input, the system is configured to provide the user's input to the LLM, but request that the LLM produce reasoning and internal process flows for developing a response-rather than produce just an output responsive to the query or request (as in conventional systems). As discussed above, the reasoning produced during workflow generation can be generated with context aware outputs (e.g., content perspective can be encoded as relationship data, and/or as vectors in models and therefore considered in output generation (e.g., of workflow steps), encoded and used to generate prompt inputs to models to focus outputs created, and combinations of both, among other options). Each of the process flows, functions, and/or individual steps described herein can be augmented to include context awareness (e.g., explicitly incorporate perspective in models, leverage relationship information to capture context, generate and use prompt inputs based on context (e.g., perspective), among other options).

In some examples, the system can be configured to have the LLM produce steps for generating a query response. The steps provide a rationale and/or process for generating a response to the given query. According to some embodiments, each articulation of the rationale and/or process steps can be leveraged by the system to improve the ultimate output (e.g., request or query response). In some examples, each step and/or rationale can be used to optimize the generation of the final AI output (e.g., query response), and may be implemented in a guided display as part of an interactive session with a user. In various embodiments, the interactive session provides an assistant functionality to respective users, and further each assistant based service or session can be tailored to specific contexts in which assistance is required. For example, underlying AI models can be specifically tailored to a user context. In another example, prompts inputs used to constrain or optimize AI model outputs can be tailored to specific contexts. Some embodiments include combinations of tailored models and tailored prompts.

Figure 2:
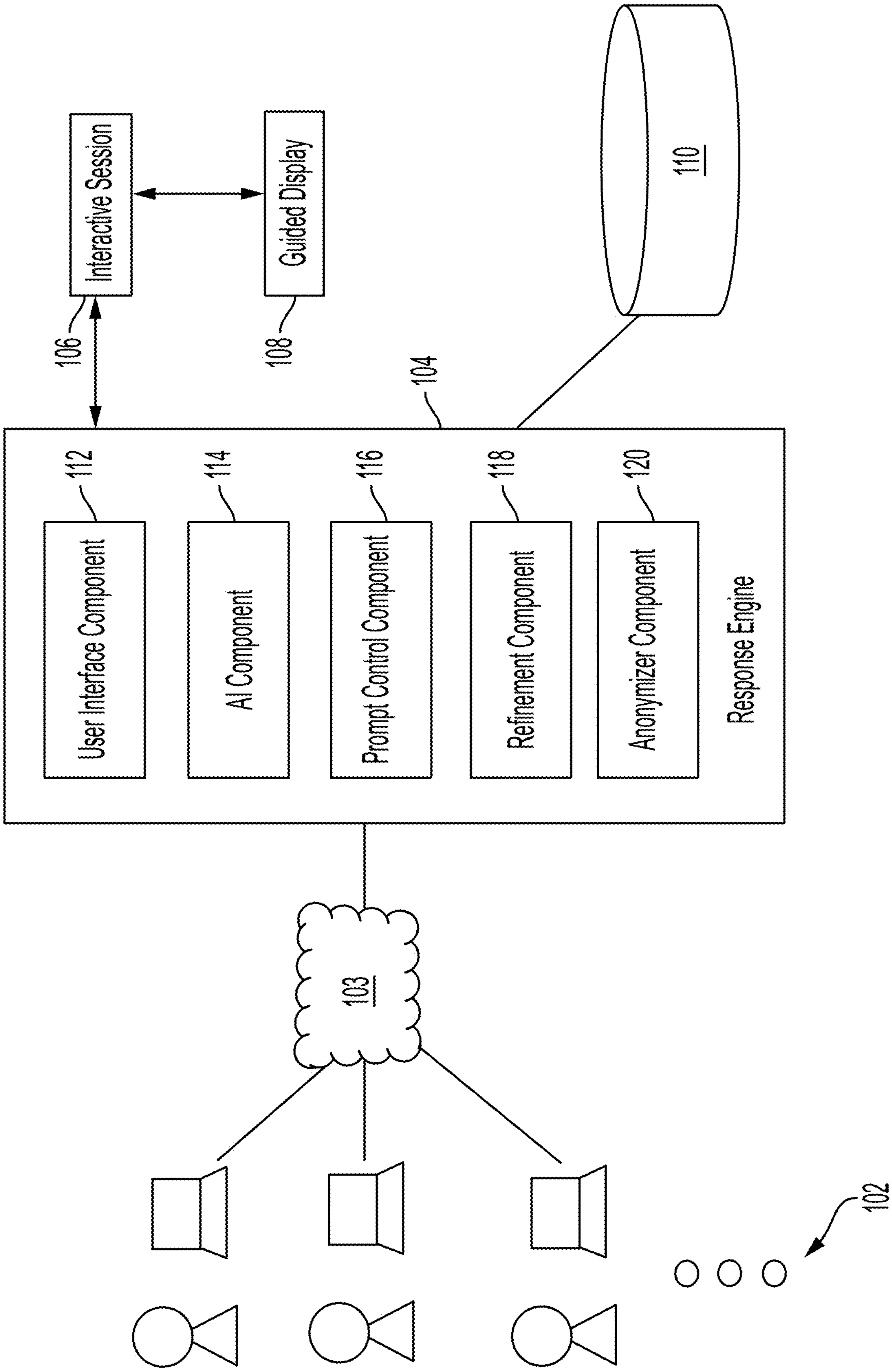
FIG. 2 is a block diagram of an example implementation, according to one embodiment.

FIG. 2 is a block diagram of an example AI workflow system 100. According to one embodiment, the workflow system 100 can be configured to manage user interaction with AI models to produce improved outputs, and, for example, AI outputs having fewer hallucinations than known approaches. According to one embodiment, the system 100 and/or response engine 104 can be configured to instantiate a plurality of components configured to perform or execute the functions described below. In other embodiments the system 100 and/or response engine 104 can be configured to perform the functions directly without requiring any specialized component.

Users (e.g., 102) can interact with the system via a network connection (e.g., 103). The network connection can be, for example, the Internet or other network (e.g., wide area network, local area network, connection to cloud computing resources, among other examples). According to one embodiment, a user (e.g., 102) can access the system via an Internet connection and interact with a user interface generated by user interface component 112. In some embodiments, the user interface component 112 is configured to guide the user through a guided session (e.g., 106). As part of the guided session 106, the user interface can present or display a text input or other query interface to the user. Once a user supplies an input, the system is configured to guide the user via the guided session to ultimately produce an output responsive to the user's request.

According to one embodiment, the user can supply a query to the user interface during the guided session 106 and shown in a guided display 108. Each step may also include a request to a user to agree or disagree with the workflow steps generated and/or the content of each step. In still other examples, a user may be asked in the guided session 106 to agree or disagree with respective steps and/or content and provide their reasoning for the agree disagree input. Some embodiments solicit critiques of the workflow steps more generally, and can request feedback on respective steps. The feedback can be used immediately to reproduce the workflow steps (e.g., using the feedback as part of the input to an AI model and the request to produce a rationale or set of steps), and shown in the guided display. In some examples, further feedback can be requested (including, for example, requests to indicate "Improved?" "Not improved?). Each feedback request can be used to improve underlying models via fin-tuning and/or can be used with prompt inputs to models to tailor respective outputs.

In another example, the guided display may ask a user more specifically: define a task that should be done for a given step (e.g., specify an action-based task) and/or define a task that should not be taken (e.g., specify an action that should not be taken). The user may be asked for a reasoning as to why they indicated: do this and do not do that. In one example, the user interface presents these requests and presents open text boxes for responses. Each of the responses provided by the user can be used by the prompt control component to guide interactions with the AI component 114 and/or underlying model. As discussed above, the guided display can be updated immediately in response to feedback, and/or the feedback can be captured and used for fine-tuning models, and/or developing prompt inputs to include in requests made on the AI model.

In some embodiments, the system can include a refinement component 118. The refinement component can be configured to fine tune underlying models (e.g., an LLM). For example, the underlying model can be retrained based on the identified steps, processes, and/or rationale generated, and may be refined in conjunction or separately from the feedback provided for each step, process, rationale in the associated workflow. According to various embodiments, the user inputs and outputs produced by associated models during a guided session can be used by either the refinement component 118 or the prompt control component to improve the outputs generated by GAI models. In still other embodiments, the same or various combinations of the information can be used by both the refinement component 118 and prompt control component 116 to improve associated outputs. In some examples, the system can include a database 110 to store user input, guided sessions, AI outputs, among other options. The associated data can be used as discussed above to improve engineered prompts to AI models, fine tune underlying models, among other options that yield more accurate outputs, and/or reduce hallucination and the outputs produced.

According to some embodiments, the system can be configured to manage prompt engineering inputs to an AI model that are tailored to force the AI model to produce outputs having defined characteristics or constraints. For example, when generating workflows associated with a user input, the system can be configured to define a minimum and/or maximum number of steps that should be produced. In other embodiments, the system can be configured to request a number of parameters for rationale or steps produced by the AI depending on context. For example, the system can define settings or context for user interaction (e.g., assistant mode, code generation mode, data processing/analytic mode, etc.). Each setting or context can be associated with rationales, and a prompt input can be included to specify the same as part of workflow generation, among other options.

According to various embodiments, the AI workflow system is configured to decompose a conventional approach for input to an AI model to produce a responsive output into a series of steps, produced by an AI model that it predicts would be used to produce a responsive output given a certain input. By decomposing the input/output process into a series of steps, the same AI model is now able to optimize the final output produced by executing through a series of steps that more effectively causes the AI to define the responsive final output. Further embodiments, leverage the steps produced to include optimization at each respective step. For example, feedback can be specified on the definition of each step. In another example, each step can be accompanied by prompts to include with the step when input into the AI model. The prompts can be based on information captured from prior execution, contextual rules, and/or based on feedback provided. Such prompt engineering enables the AI workflow system to produce output to requests with greater accuracy than known approaches.

Figure 3:
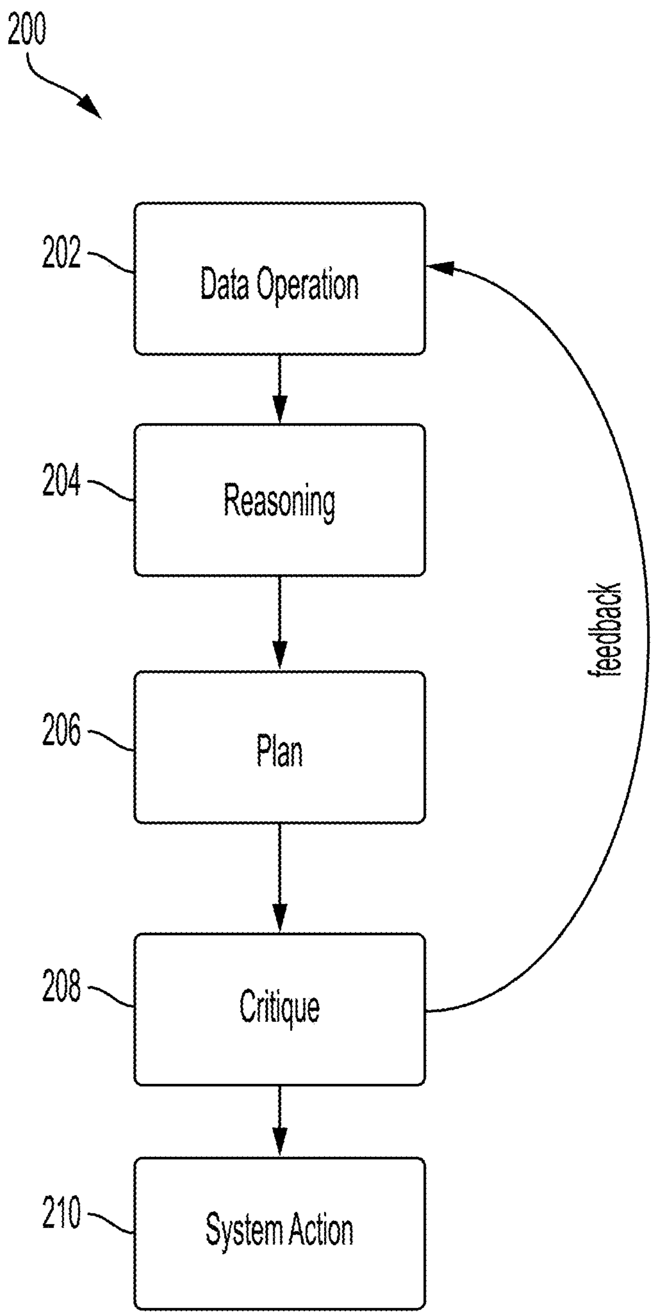
FIG. 3 is an example process flow, according to one embodiment.

FIG. 3 is an example process flow 200, that illustrates at a high-level an example of instructing an AI model to articulate a set of workflow steps (e.g., reasoning and internal process) that are performed in response to an input. In the context of an AI managed chat interface, the process 200 can be executed to identify workflow steps that begin with a user text input, generation of a set of workflow steps that are associated with producing a response to the user text input, optimization (e.g., critique) of the workflow steps, and generation of a final output for to the user input (e.g., system action). More generally, process 200 can begin at 202 with an idea indicated via input to a user interface. In an AI chatbot context, a text based (or voice input) can be used to articulate a request, query, or more generally an idea. In a data management context, a user input can be provided via visual selection of data sources, text-based, voice input, among other options and can be used to define a data management request, or more generally an idea that will be the basis of AI generated data management operations.

For example, a request can be presented in a user interface to transform data sources from one schema to another, de-duplicate data, merge data, normalize data, obscured data, validate and/or cleanse data, and/or anonymize data. The request and/or input can be used to generate a workflow for responding using an AI model, and for example, an LLM. Returning to the process 200 once a user input has been received (e.g., 202), process 200 can continue at 204 with a request to define the reasoning or process steps associated with responding to the idea. In some embodiments, an AI model can be asked to show its work in response to an idea articulated by a user. The request to "show its work," can include specification of structure for articulating a reasoning at 204. In one example, a reasoning request at 204 can include a requirement that the rationale or reasoning be broken down into a set of having a minimum number of steps (e.g., at least three steps), and may also include a requirement to state a high-level idea step and specific sub-steps for any required number of steps and can optionally include a requirement for a minimum number of sub-steps.

According to one embodiment, an AI model can be asked how many steps should be used for a given idea or input as part of the reasoning analysis of 204. Process 200 can use the AI determined number as a further prompt to the AI model when establishing requirements for defining steps of a workflow. In other examples, the system can invoke rule-based logic to define a set of steps and/or sub-steps that are requested as part of the output. In some examples, a context can be used by the system to retrieve pre-defined operations that can be used in conjunction with user inputs to AI models, for example, as part of prompt engineering for generating an AI output. In on example, the system can identify a data management context, and used pre-defined high level tasks (e.g., generate common data model, generate data model for source, identify similar fields for consolidations, data deduplication, generate transformations for data from one schema to another, normalization of data, cleansing of data, validation of data, among other options).

In further example, these requirements can be submitted to an AI model as part of a prompt to ensure specific conditions are met when building or defining a reasoning. Once the set of steps is defined, they can be presented as a plan at 206, assuming any input requirements are met. If input requirements have not been met, the prompt information can be updated and the set of steps regenerated. Prompt updates can be made by requesting the AI model provide a prompt update to resolve any deficiency, for example.

According to some embodiments, as part of defining the plan 206, the process 200 may validate if a produced plan meets any specified requirements. Optionally, the plan defined at 206 can be presented to an end user. Each step and/or sub-step may include a request to critique the stated action, step, and/or concept. Each critique can be used as part of a feedback loop for idea generation in 202, reasoning articulation at 204, and/or planning at 206. Shown in the example process flow is a feedback loop to step 202, however the feedback loop may be introduced at any preceding step to improve the definition of a plan.

Once any critique has been entered for any defined step or sub-step, process 200 can continue at 210 with system action. According to one embodiment, the system action at 210 includes executing the workflow defined to respond to user input/idea.

In other embodiments, the system action can include code generation that accomplishes the defined steps. For example, an LLM (e.g., ChatGPT) can be configured to produce code from natural language input and an identification of a code base to use for generating the source code. The system can supply the set of steps as functionality to be reduced to source code and supply a default code language to use. In other examples, users can identify a coding language to use as part of system preferences.

In the data management context, generating a common data schema can include mapping of data fields from one or more data sources to a destination database. An LLM can be used to build code for moving or transforming the source data to the destination database. For example, the mappings can be used as an input with a request to provide executable code to the LLM. The resulting code can be provided via download. In some embodiments, the guided session can be configured to build a validation test for the generated code. For example, the user can trigger a test run of the code against the source data, and the destination database can be evaluated to determine validity. In some examples, the AI model can be asked to evaluate the destination database to ensure it matches the field and properties defined in respective workflow steps, among other options.

Figure 4:
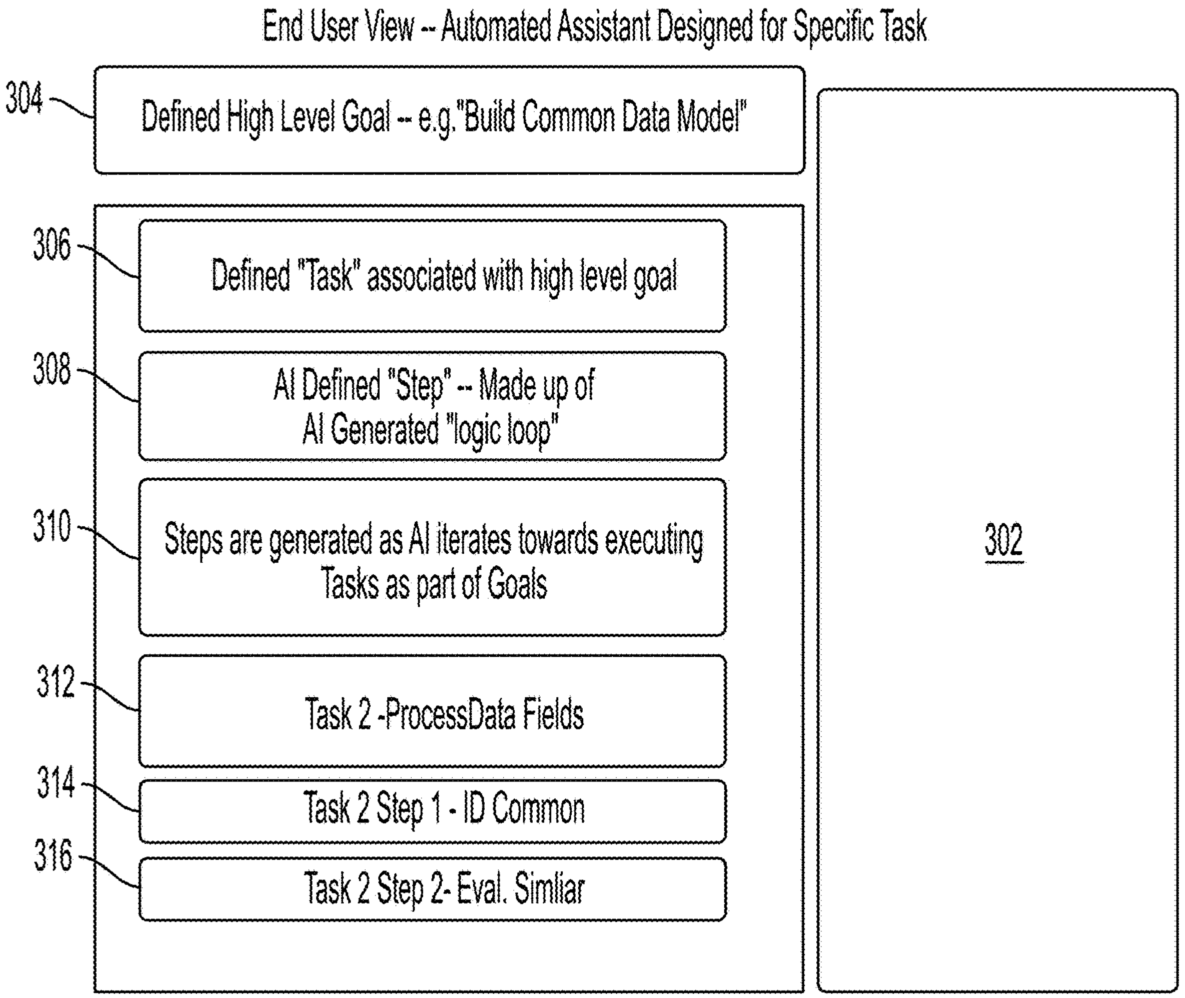
FIG. 4 is an example user interface, according to one embodiment.

FIG. 4 shows an example user interface for managing a chat session with an end user. According to one embodiment, the interface 300 can be presented as an end user view of an automated assistant. The automated assistant can be designed for specific tasks and/or tailored to a specific context or setting. More generally, the interface 300 is configured to manage a guided session with an end user to define high-level goals, tasks, and steps that are based on an AI generated logic loop.

Shown in FIG. 4 is a chat or interactive portion of the window that can be displayed to an end user (e.g., 302). The end user may enter information into the interactive portion of the window 302. In some embodiments, the user input is used to extract a high-level goal or accept a user definition of a high-level goal (e.g., marketing campaign 304). In one example, input at 302 is used to define a high-level goal associated with the user input as well as any tasks associated with a high-level goal (e.g., shown at 306). According to one embodiment, the input of 302 is used by an AI model which may be accompanied by requirements identified in the input to the AI model to produce a high-level goal and one or more tasks associated with the high-level goal as an output. According to another embodiment, the user interface can include prompts requesting that the user identify a high-level goal associated with their input or desire, as well as at least one task associated with the high-level goal.

Although some embodiments provide access to a data management interface/assistant, other embodiments operate workflow generation and execution entirely in the background without user interactions. In still other embodiments, workflow generation can be performed in the background with an AI component that provides feedback on workflow steps, and executes, automatically, interactions with a respective workflow based on any one or more of: historical workflow generation, client preferences, client context (e.g., anonymize data, security priority, transform data, etc.).

In still other embodiments, the system can use the high-level goal and associated task(s) to generate a series of steps associated with each task for the high-level goal. The display can include visual elements associated with respective tasks and steps generated to complete them (e.g., 308 and 310). Tasks and steps may be grouped together. For example, a second task may be shown at 312 with associated steps at 314 and 316.

In the data management setting, an example high level goal can be defined as "Build Common Data Model" at 304, and an example task that makes up the high-level goal can be defined "Process Data Fields" and shown at 312. Steps within the various tasks can be defined as part of a workflow and may include for example a step to identify common data fields (314), for example, from identified source data, and a step to identify similar data fields (316) that should be merged, among other options.

In further embodiments, tasks can be defined to anonymize data, and the assistant display and chat can be configured to identify data fields having respective values that should be anonymized. Users can interact with the display of such steps to validate the AI identification of fields to be anonymized, and/or to validate the resulting anonymization, among other options.

Various embodiments integrate perspective information or context information to influence the creation of workflow steps. For example, when creating a candidate workflow, the step(s) created can be determined by an AI model. The AI model can be provided with a prompt to generate a series of steps to accomplish a user request, and in addition the prompt can include perspective (or more generally context) conditions. User feedback can be used to improve the workflow generation and AI output target, and similarly the AI model for generating workflow steps can be improved. In some examples, the prompt generating AI model can be fine-tuned based on context/perspective and can be retrained to include context/perspective data. In still other embodiments, relationship information can be accessed to identify sources of information an AI model can use to build a set or specific workflow steps, among other options. Further embodiments can partition vectorized data using a target of an AI model request/output process based on context information and/or more specifically perspective information.

Figure 5:
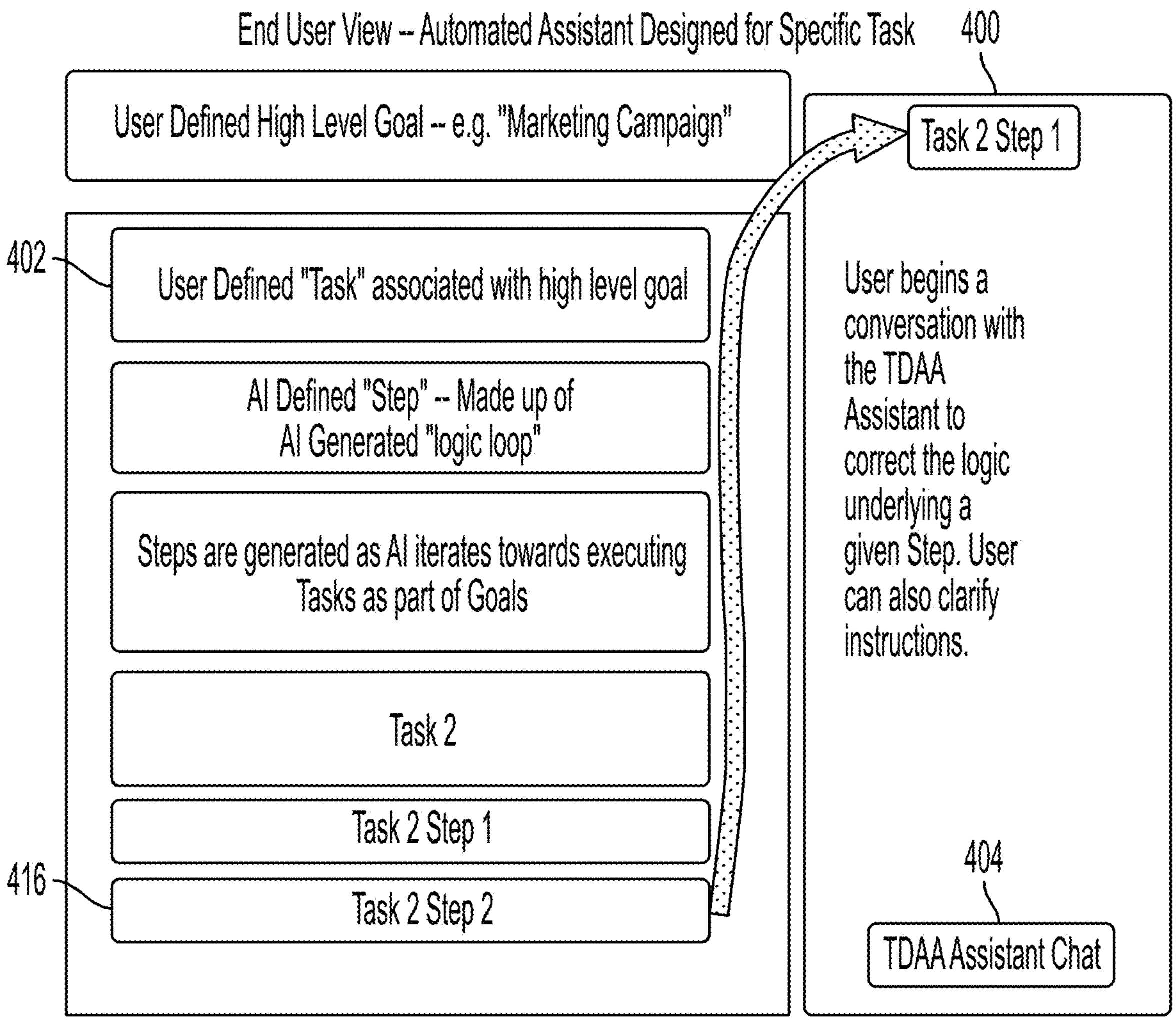
FIG. 5 is an example user interface, according to one embodiment.

FIG. 5 shows another embodiment of the user interface 400. An AI workflow system can be configured to present user interface 400 to an end user and step through each element of the display shown on the left side of the interface at 402. For example, task two step two at 416 can be highlighted in the interface and shown on the right side of the screen so that an end user can critique or provide input on the AI defined task and/or step. Further, the user interface is configured to enable the end user to select any step or element, provide feedback, and/or trigger updates to the displayed set of steps.

Figure 6:
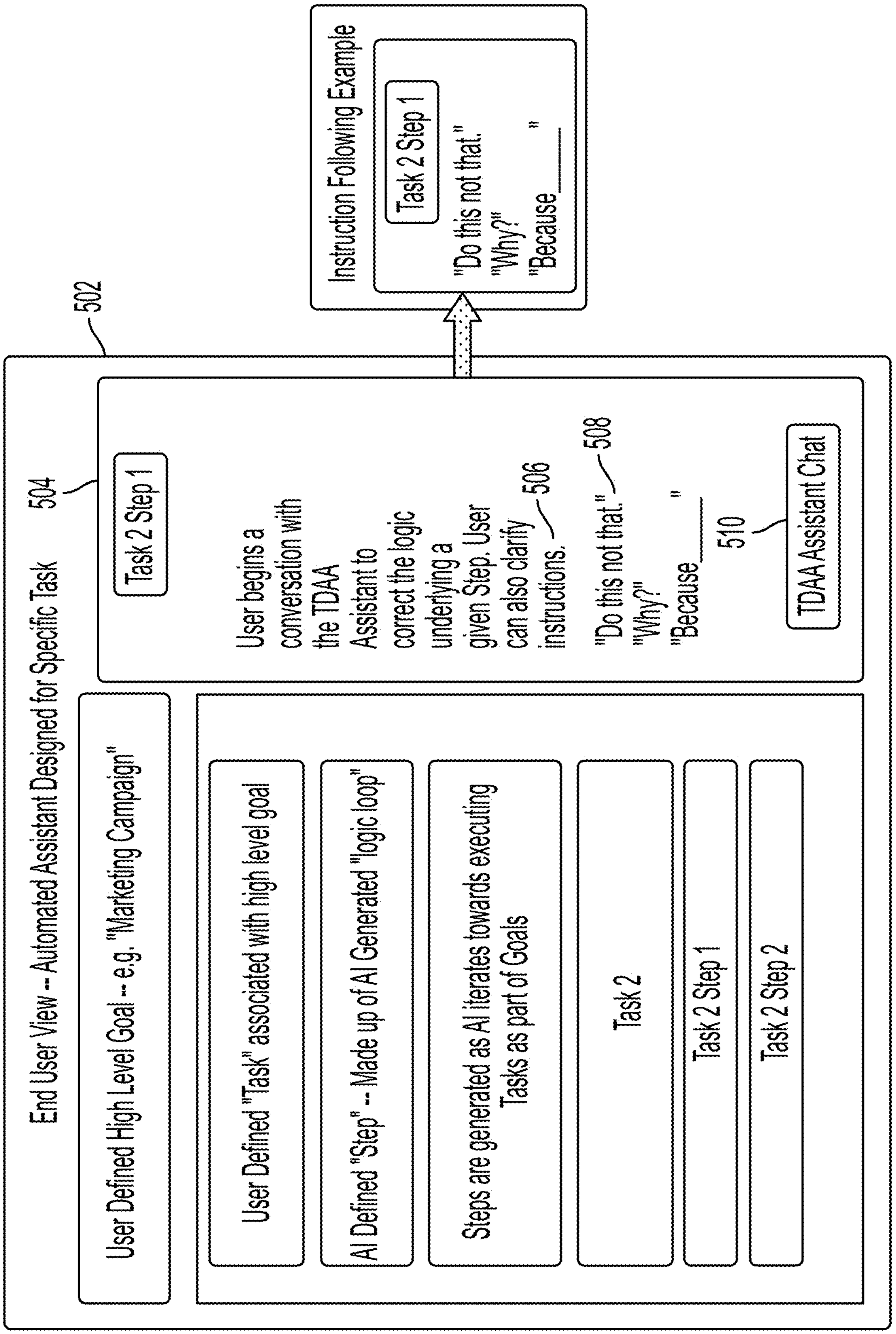
FIG. 6 is an example user interface, according to one embodiment.

FIG. 6 shows another embodiment of a user interface 500. The user interface 500 can be configured to prompt an end user to provide information on defined steps, tasks, high-level goals, etc. According to one embodiment, an AI workflow system can be configured to present user interface 500 and guide an end user through an interaction with the visual elements shown on the left side of the display at 502. For example, the user interface 500 may include an interactive window at 504 to prompt the user for their input on respective steps and/or tasks. In one example, the system is configured to prompt the user to provide information on an action that should be taken (e.g., 506) any action that should not be taken (e.g., 508), and to provide a rationale for those constraints (e.g., 510).

Figure 7:
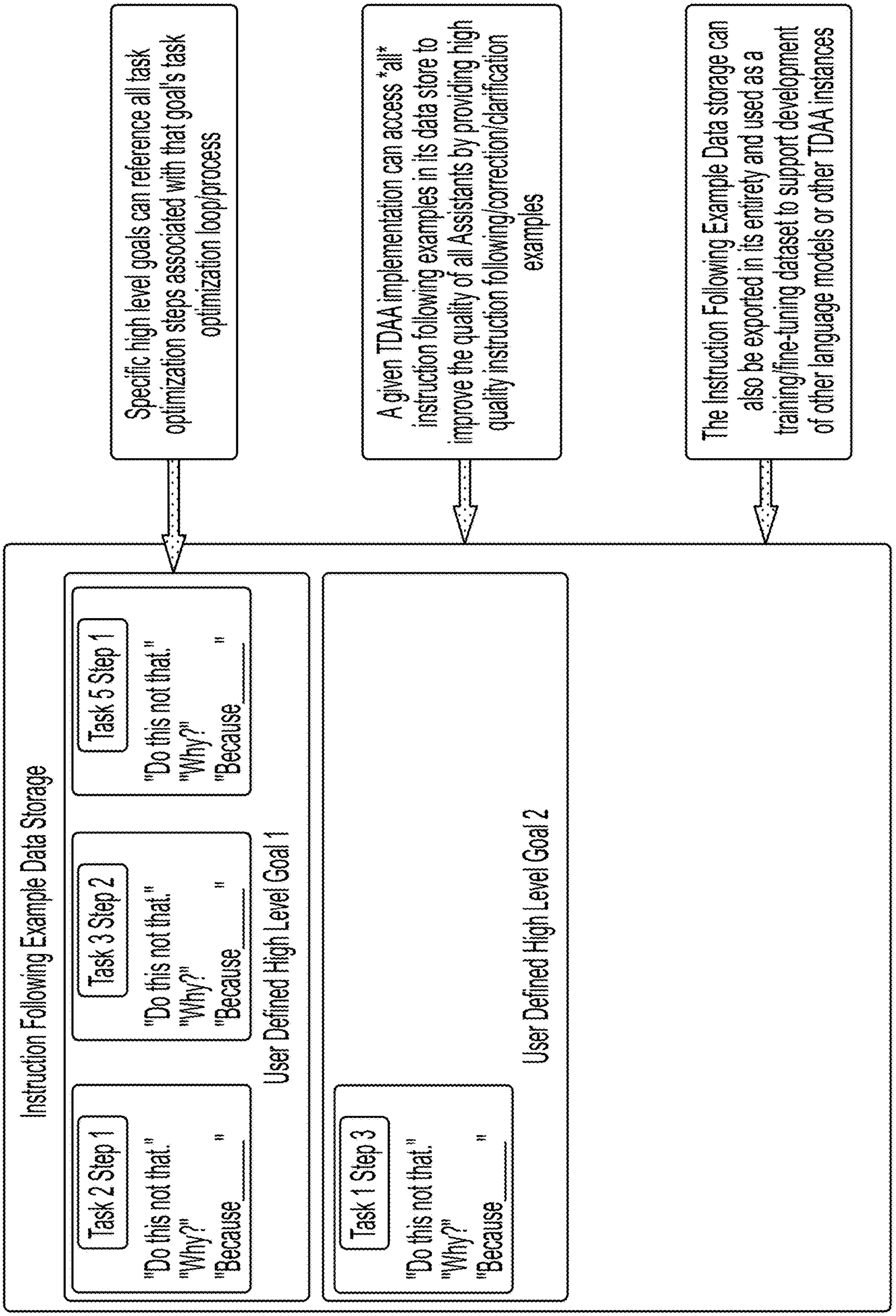
FIG. 7 is an example of process flow, according to one embodiment.

FIG. 7 illustrates a process flow associated with a guided session. FIG. 6 highlights some respective steps of a guided session, and the organization of specific tasks and/or steps with a respective high-level goal. The data generated during a guided session can be stored and used to optimize the construction of tasks and/or steps for any high-level goal. As shown, each task and associated staff includes a critique or reasoning associated with the specific step. In some examples the critique and/or reasoning can be used to fine-tune or regenerate an associated step and/or task. In further embodiments, the data stored with respect to any guided session can be used to fine tune generation of high-level goals, tasks, and/or steps. In further embodiments, the context associated with guided sessions may also be stored and used to filter or wait data captured for use in workflow generation.

Figure 8:
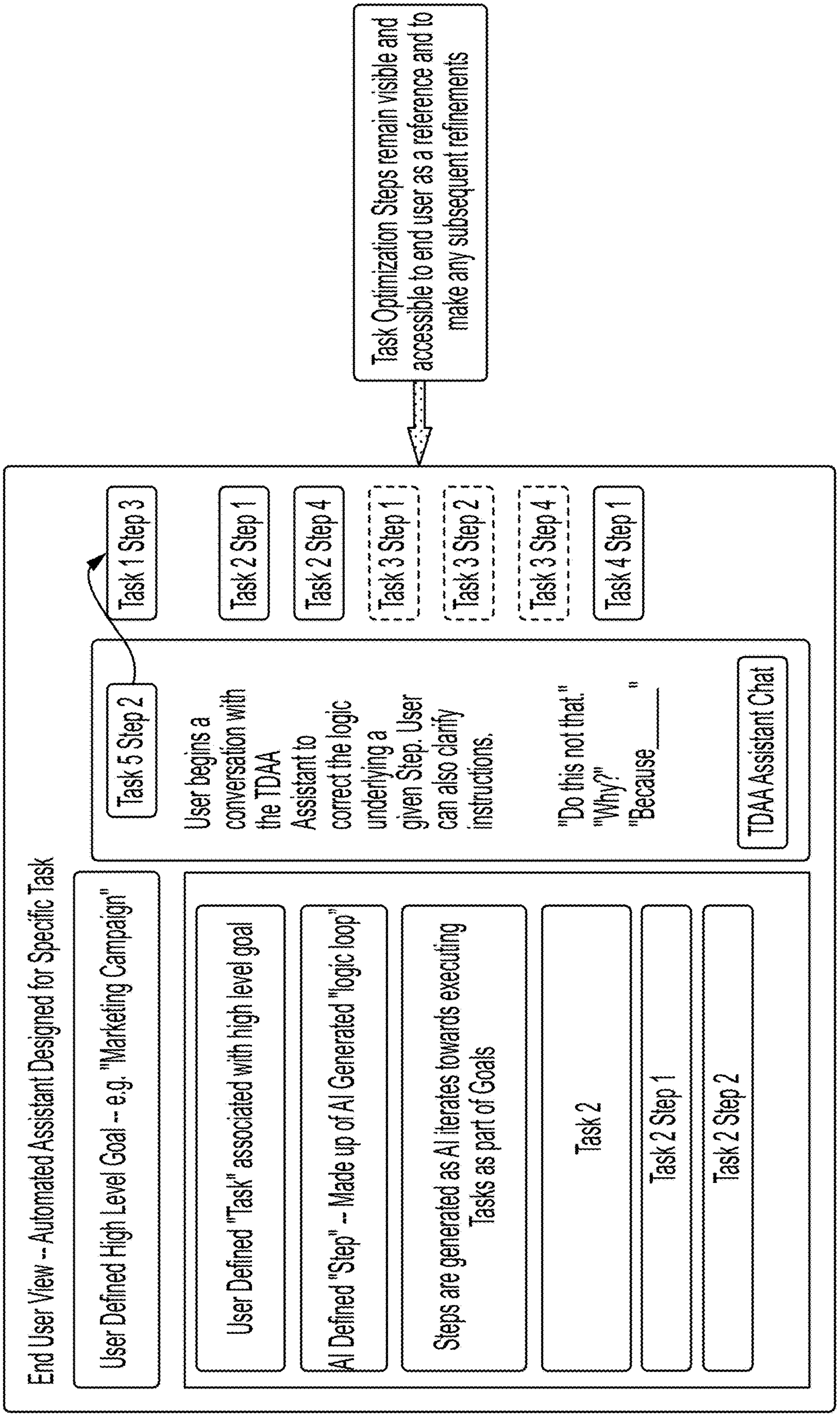
FIG. 8. is an example user interface, according to one embodiment.

FIG. 8 is another example of a user interface presented as an end user view 700. As shown, an end user can interact with a high-level goal, tasks, and/or steps. In various embodiments, the task optimization steps remain visible in the user interface and are accessible to the end user as a reference or to make any subsequent refinements, among other options.

According to one embodiment, the guided session interface described above can be tailored to specific settings, including, for example, presented to data administrators or client users and may also be conceptual in nature. For example, users may specify a broad concept (e.g., clean data, secure data, optimize data storage, etc.), and the system can invoke workflow generation to identify specific steps that will accomplish the broad concept. In other embodiments, the system can take on the role of feedback provider as part of a workflow generation process (e.g., requesting an LLM provide critique on respective workflow steps and/or regenerate with such feedback). Thus, while the system performs the same functions as in a user based feedback session, there is no associated display or assistant interaction with a user. In still other embodiments, the system can execute the workflow generation and use the generated workflow directly (e.g., without user or AI feedback for each step/sub-step).

Figure 9:
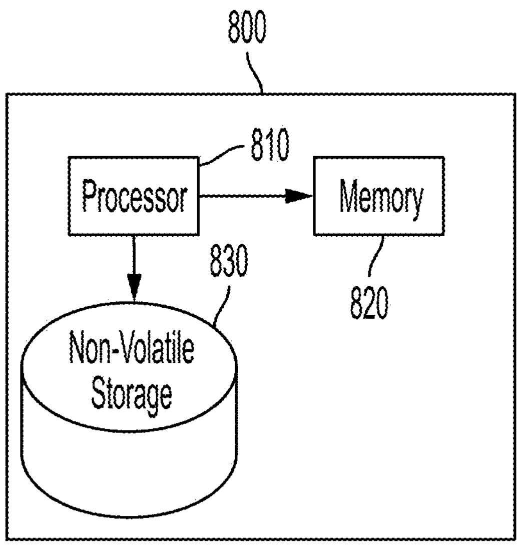
FIG. 9 is a block diagram of an example computer system improved by implementation of the functions, operations, and/or architectures described herein.
Figure 10:
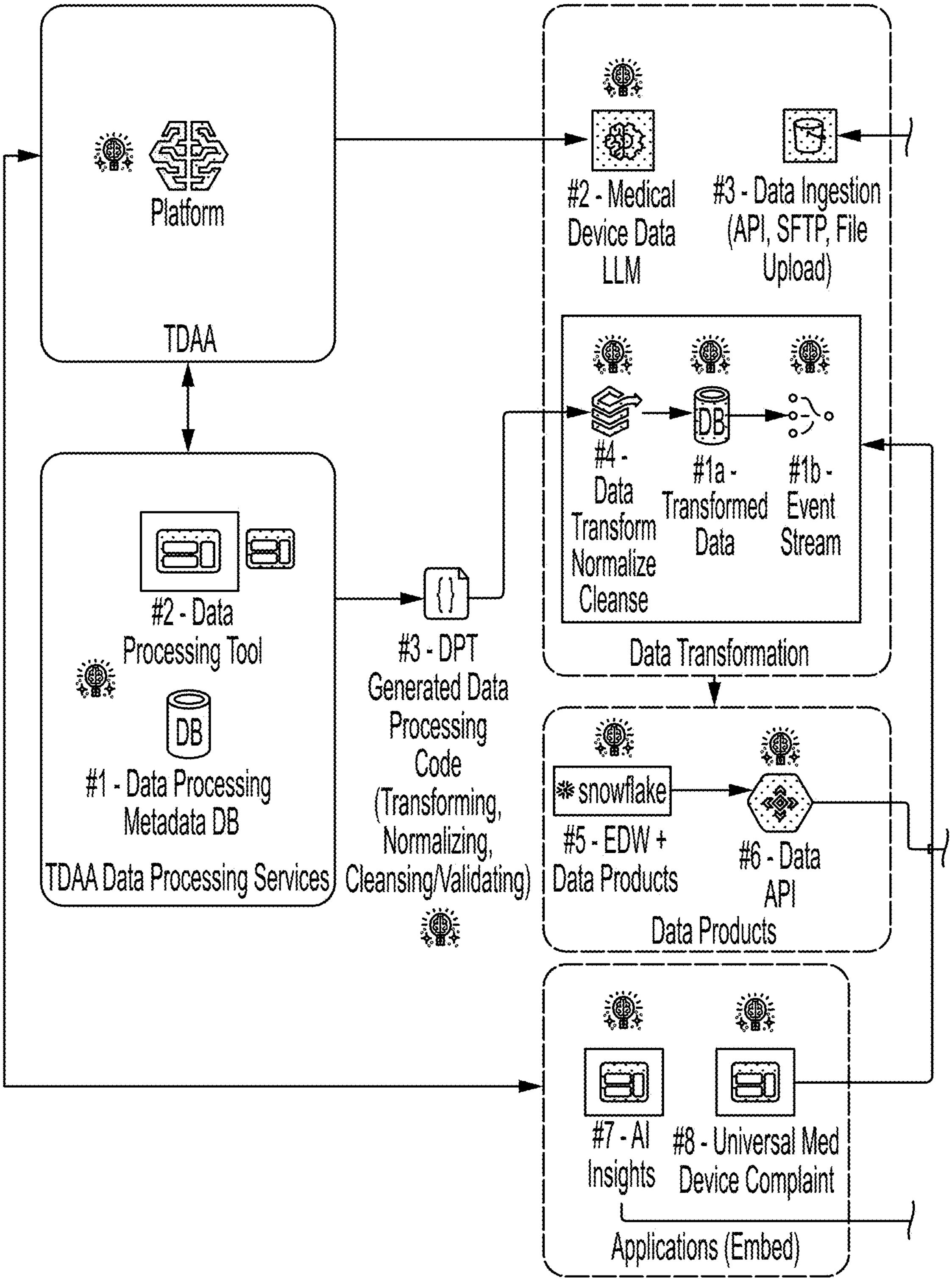
FIG. 10 is an example block diagram and functionality flow of an implementation environment, according to one embodiment.
Figure 10:
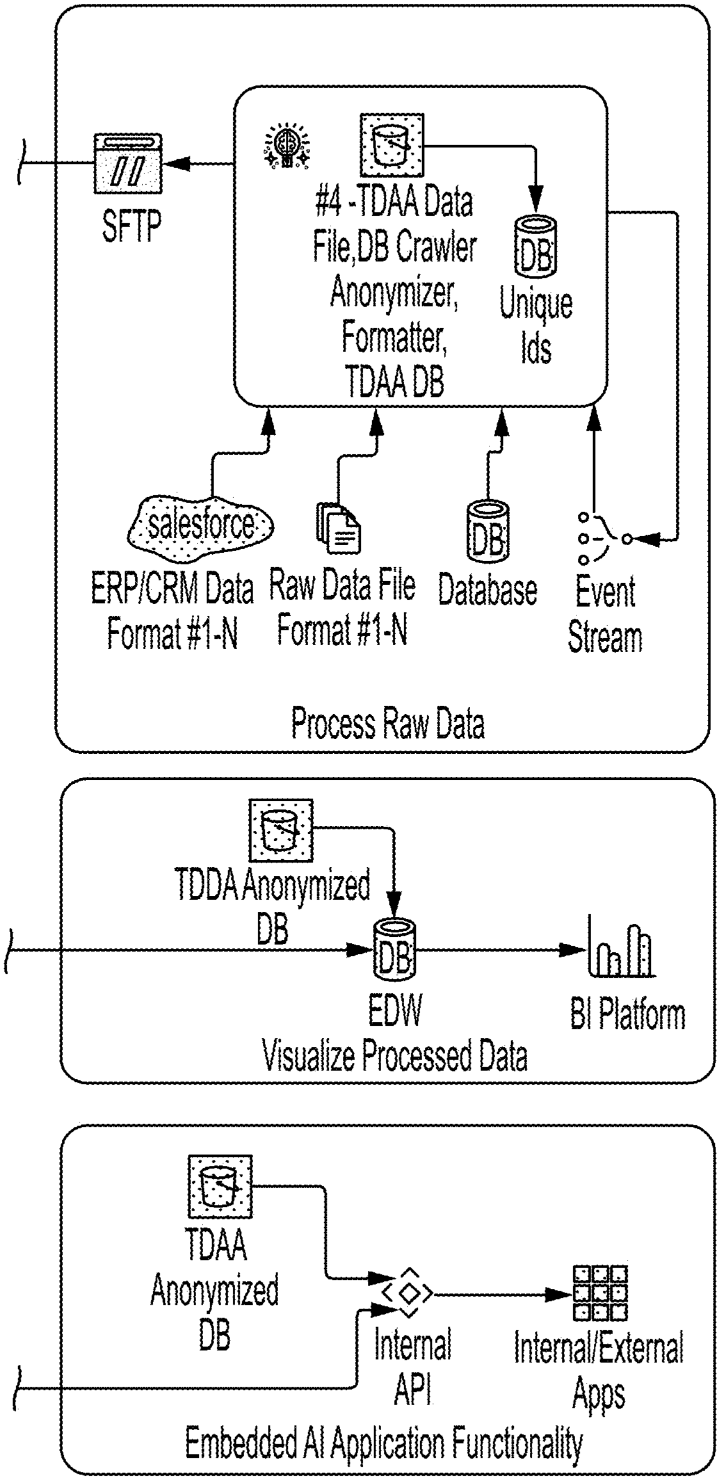
Figure 12:
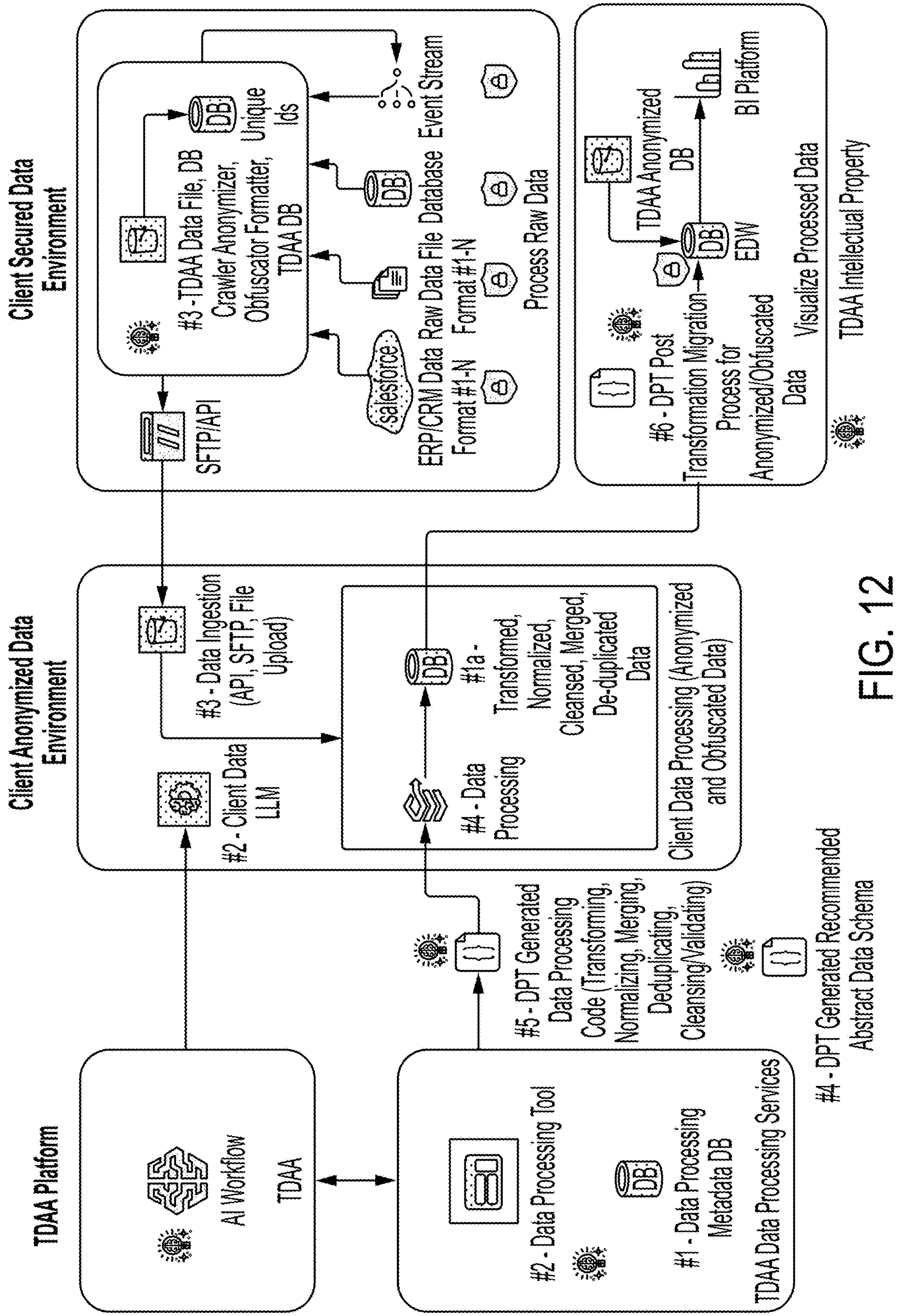
FIG. 12 is an example block diagram and functionality flow of an implementation environment, according to one embodiment.

FIG. 9 is a block diagram of an example computer system that is improved by implementing the functions, operations, and/or architectures described herein. Modifications and variations of the discussed embodiments will be apparent to those of ordinary skill in the art and all such modifications and variations are included within the scope of the appended claims. Additionally, an illustrative implementation of a computer system 800 that may be used in connection with any of the embodiments of the disclosure provided herein is shown in FIG. 8. The computer system 800 may include one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner. To perform any of the functionality described herein (e.g., image reconstruction, anomaly detection, etc.), the processor 810 may execute one or more processor-executable instructions stored in one or more non-transitory computer-readable storage media (e.g., the memory 820), which may serve as non-transitory computer-readable storage media storing processor-executable instructions for execution by the processor 810.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationships between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described herein) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

In other embodiments, various ones of the functions and/or portions of the flows discussed herein can be executed in different order. In still other embodiments, various ones of the functions and/or portions of the flow can be omitted, or consolidated. In yet other embodiments, various ones of the functions and/or portions of the flow can be combined, and used in various combinations of the disclosed flows, portions of flows, and/or individual functions. In various examples, various ones of the screens, functions and/or algorithms can be combined, and can be used in various combinations of the disclosed functions.

Example Implementation Data Management Systems

In various embodiments, an AI governance/management system is configured to host a guided session for any end user or system. In one example, this can take place for systems that provide data management tools via generating workflow steps for the underlying data. The guided session is configured to identify data management operations on user specific data sources. In various examples, a user (e.g., administrator, database administrator, etc.). can designate a variety of data sources (e.g., heterogeneous, homogeneous, relational, non-relational, etc.) via a user interface. The AI management system can be used to analyze the data sources specified to generate a canonical data format spanning the multiple data sources, generate code for mapping the data sources into a canonical format, normalize the resulting data, cleanse the resulting data, validates the resulting date, and automatically generate code for each function (e.g., obfuscate, anonymize, transform, merge, de-duplicate, normalize, cleanse, and/or validate the data).

According to one embodiment, the system leverages a plurality of LLMs to request that the models analyze data sources to identify a set of workflow steps to produce a canonical data schema, rather than generate an output that specifies the canonical data schema format as would be done in conventional implementation. Similarly, once a final canonical format is approved, the anonymization, obfuscation, merging, deduplication, transformation, normalization, cleansing, and validation functions can be decomposed into a series of workflow steps that the models identify, present, and optimize (optionally based on feedback in a guided session). Optimization may include, user provided feedback, fine-tuning AI models, and/or prompt engineering of requests to the AI models. The optimized workflows can then be executed to produce more accurate (e.g., less hallucinations) and refined results (e.g., improved precision) over conventional approaches. In further embodiments, the AI management system is configured to break data management tasks into workflows that can be presented in user interfaces, critiqued and/or accepted, and once validated used to automatically generate code in a variety of different programming languages or third party data integration applications and platforms for each function.

In various examples, the workflow breakdown of steps includes a rationale and/or specific steps process for data management functions, generating a response to a user request and/or query, among other options. According to some embodiments, each articulation of the rationale and/or process steps can be leveraged by the system to improve the ultimate output (e.g., data management task, user request, and/or query response). Each step and/or rationale can be used to optimize the generation of the final AI output, and may be implemented in a guided session/display, for example, as part of a guided session with a user. In various embodiments, the guided session provides an assistant functionality to respective users, and further each assistant based service or session can be tailored to specific contexts in which assistance is required. For example, underlying AI models can be specifically tailored to a user context. In another example, prompt inputs used to constrain or optimize AI model outputs can be tailored to specific contexts. Some embodiments include combinations of tailored models and tailored prompts.

Returning to FIG. 2, shown is the block diagram of an example workflow system 100 that is tailored to a data management implementation. According to one embodiment, the workflow system 100 can be configured to manage user interaction with AI models to produce improved outputs, and, for example, AI outputs having fewer hallucinations than known approaches. According to one embodiment, the system 100 and/or response engine 104 can be configured to instantiate a plurality of components configured to perform or execute the functions described below. In other embodiments the system 100 and/or response engine 104 can be configured to perform the functions directly without requiring any specialized component.

Users (e.g., 102) can interact with the system via a network connection (e.g., 103). The network connection can be, for example, the Internet or other network (e.g., wide area network, local area network, connection to cloud computing resources, among other examples). According to one embodiment, a user (e.g., 102) can access the system via an Internet connection and interact with a user interface generated by user interface component 112. In some embodiments, the user interface component 112 is configured to guide the user through a guided session (e.g., 106). As part of the guided session 106, the user interface can present or display a text input or other query interface to the user. In one example, the user interface can include a display tailored to user identification of data sources. Once a user supplies an input, the system is configured to guide the user via the guided session to ultimately produce an output responsive to the user's request. According to various embodiments, the system is configured to provide an assistance function suite for data management operations, and may also include functionality to flatten or denormalize data, anonymize sensitive data in a way that allows for the anonymized file to be associated with the sensitive data in a later process, and also generate code according to a data management workflow defined and/or optimized during a guided session. In further examples, the system can be configured to obfuscate fields in addition to anonymization. In some examples, data can be mutated to obscure the underlying values. The mutations and/or transformation algorithms can be generated by a client, maintained by a client, enabling increased security even when the workflow system is operating to manage data. According to various embodiments, the system can enable users to identify fields to obscure, fields to anonymize, etc., in a user interface. The system is configured to manage the data transformations and/or mutations on the specified fields. In some alternatives, the system can crawl or analyze client data and identify candidate fields to anonymize and/or obfuscate. For example, via a locally executing process. Client preferences can be specified to enable the system to select between anonymize/obfuscate function, among other options. In one example, the system can generate an initial or candidate workflow for an operation, and refine the candidate workflow with user feedback.

According to one embodiment, the user can define any number of data sources in the user interface, for example, during the guided session. The system is configured to analyze the identified data sources and may use a first high level goal of defining a recommended list of data fields to anonymize and/or defining or generating a canonical data format for the identified data sources. According to one embodiment, the AI component 114 is configured to analyze the data sources. According to some embodiments, the AI component 114 is configured to accept a user input and produce a responsive output based on providing the identified data sources and a task as a prompt to a trained AI model. In one example, the trained model is an LLM. Conventionally, an LLM is configured to accept a user input specifying data sources and a request to build a data model, and the LLM is configured to produce a responsive output specifying the data model. In various embodiments, the system, response engine, or AI component can be configured to generate a workflow for constructing a common data model based on the identified data sources. The AI generated workflow can include a plurality of steps, including for example, extract data fields, identify common data fields, identify similar data fields, map similar data fields, process user identified data mappings, link specified terms, link data fields, etc. Each step can be presented as part of a guided session or display (e.g., 108). In various embodiments, once a set of steps has been confirmed, or optimized according to provided feedback, the AI component is configured to generate code to accomplish the set of steps. Generally, an AI model (e.g., LLM) can be given a request to generate code having users specify functions and request code generation and return executable code as an output. In various embodiments, this capability is improved by having the workflow decompose coding or overarching tasks into a series of steps/tasks and generating code associated with each step. Additionally, the code from respective prior steps can be used as part of a prompt input for generating code for a next step, improving the ability of the model to generate precise and accurate code. In other embodiments, the workflow can be used as the input to the model to generate code, and the specification of the workflow as steps improve over conventional implementation in terms of accuracy, precisions, and reduced error in generated code, among other examples.

According to various embodiments, the system can be configured to provide prompt inputs to the LLM in conjunction with specification of one or more data sources. The prompt input can be tailored so that the LLM generates a workflow output for producing an abstract data schema rather than producing a discrete data schema directly, as would be done in conventional approaches. In one example, the prompt input specifies that the LLM must construct or identify a series of steps that should be executed to produce the abstract data schema. The prompt input can include constraints or requirements on the generated workflow. The constraints can specify a minimum number of steps, identify specific parameters in a data model that are required (e.g., input by the user), order of precedence for the data and/or data model, among other options. Various constraints can be supplied by the system and can include constraints defined by the user.

Generally stated, the LLM can produce a workflow that identifies a series of tasks for the data management approach, including, for example: identify common data fields, identify similar data fields, optionally, consolidate similar data fields, and generate mappings from the data sources to the common data schema, transform data from one schema to another, normalize data, cleanse data, merge data, de-duplicate date, anonymize data, among other options. Each task may include additional steps or sub-steps. In some embodiments, the system is configured to allow a user to request any one or more of the above functions, generate a workflow in the background, execute the workflow and produce an output based on executed workflow (e.g., output abstract data schema, and/or code to generate the abstract data schema, etc.). In other embodiments, the system is configured to enable user interaction with at least one of the workflow steps, providing the option for user feedback to inform workflow generation, step regeneration, prompt engineering to include feedback, among other options.

In further embodiments, the guided display is also configured to show the user a series of steps and/or processes that define a workflow used to produce the ultimate output, and allow the system to interact with the user to optimize the workflow steps. For example, the user interface component 112 can be configured to accept a user request/input and provide that request/input to the AI component 114 with instruction to produce a series of steps and/or processes that would be used to provide an answer or output associated with the user request/input. According to some embodiments, an LLM can be given the user input with additional requirements (e.g., defined as a prompt input) to produce the series of steps and/or processes that would be used to generate a response. In various embodiments, the series of steps and/or processes can be used by the system to produce a more accurate final response relative to conventional approaches. For example, by executing each step of a workflow rather than producing an output directly many LLM models produce more accurate results, including for example, results with fewer hallucinations. In other examples, the guided session provides direct feedback on the various steps, including acknowledgement of a generated workflow step, refinement actions (e.g., do "x" and do not do "y"), and the feedback can be used to improve each workflow step, and yield additional improvements in accuracy and precisions for the output. In some examples, the steps and/or processes output by the model are used to build a guided display 108 shown to end users 102.

In some embodiments, the system can include a prompt control component 116. The prompt control component 116 can be configured to add requirements to trigger an LLM to produce the series of steps/processes that make up a workflow. In other examples, the prompt control component 116 can be configured to request that a GAI model produce a rationale associated with generating high level data management functions (e.g., create an abstract data schema, transform data from one schema to another, de-duplicated data, merge data, normalize data, cleanse data, validate data, anonymize data, obfuscate data, etc.). Stated generally, various GAI models can be used to produce a set of steps, processes, rationales, etc., that form the basis of a workflow optimization that improves final outputs delivered by any AI model.

According to one embodiment, each step produced can be displayed as part of a guided session 106 and shown in a guided display 108. Each step may also include a request to a user to agree or disagree with the workflow steps generated and/or the content of each step. In still other examples, a user may be asked in the guided session 106 to agree or disagree with respective steps and/or content and provide their reasoning for the agree disagree input. Some embodiments solicit critiques of the workflow steps more generally, and can request feedback on respective steps. The feedback can be used immediately to reproduce the workflow steps (e.g., using the feedback as part of the input to an AI model and the request to produce a rationale or set of steps), and shown in the guided display. In some examples, further feedback can be requested (including, for example, requests to indicate "Improved?" "Not improved?). Each feedback request can be used to improve underlying models via fine-tuning and/or can be used as part of or as prompt inputs to models to tailor respective outputs.

In another example, the guided display may ask a user more specifically: define a task that should be done for a given step (e.g., specify an action-based task) and/or define a task that should not be taken for a given step (e.g., specify an action that should not be taken). For example, the user can define data fields in their data sources that should remain pristine (unmerged), and/or identify known duplicates fields, matched data fields with different names, etc. The user may be asked for a reasoning as to why they indicated: do "this" and do not do "that." In one example, the user interface presents these requests and presents open text boxes for responses. Each of the responses provided by the user can be used by the prompt control component to guide interactions with the AI component 114 and/or underlying model. As discussed above, the guided display can be updated immediately in response to feedback, and/or the feedback can be captured and used for fine-tuning models, and/or developing prompt inputs to include in requests made on the AI model.

In some embodiments, the system can include a refinement component 118. The refinement component can be configured to fine tune underlying models (e.g., an LLM). For example, the underlying model can be retrained based on the identified steps, processes, critiques, and/or rationale generated, and may be refined in conjunction or separately from the feedback provided for each step, process, or rationale in the associated workflow. According to various embodiments, the user inputs and outputs produced by associated models during a guided session can be used by either the refinement component 118 or the prompt control component to improve the outputs generated by GAI models. In still other embodiments, the same or various combinations of the information can be used by both the refinement component 118 and prompt control component 116 to improve associated outputs. In some examples, the system can include a database 110 to store user input, workflow steps, guided sessions, AI outputs, among other options. The associated data can be used as discussed above to improve engineered prompts to AI models, fine tune underlying models, among other options that yield more accurate outputs, and/or reduce hallucination and the outputs produced.

According to some embodiments, the system can be configured to manage prompt engineering inputs to an AI model that are tailored to force the AI model to produce outputs having defined characteristics or constraints. For example, when generating workflows associated with data management functions and/or user specified data sources, the system can be configured to define a minimum and/or maximum number of steps that should be produced, for example, on respective high-level targets (e.g., define common data format/schema, de-duplicate data, merge data, normalize data, transform data from one schema to another, anonymize data, obfuscate data, cleanse data, validate data, etc.) or based on an entire workflow, among other options. In other embodiments, the system can be configured to request a number of parameters for rationale or steps produced by the AI depending on context. For example, the system can define settings or context for user interaction (e.g., assistant mode, code generation mode, data management, data processing/analytic mode, etc.). Each setting or context can be associated with rationales, and a prompt input can be included to specify the rationale as part of any prompt or input given to an AI model, among other options.

According to various embodiments, the AI workflow system is configured to decompose a conventional approach for input to an AI model to produce a responsive output into a series of steps, produced by an AI model that it predicts would be used to produce a responsive output given a certain input. By decomposing the input/output generation process into a series of steps, the same AI model is now able to optimize the final output produced by executing through a series of steps that more effectively causes the AI to define the responsive final output. Further embodiments leverage the steps produced to include additional optimizations at each respective step. For example, feedback can be specified on the definition of each step. In another example, each step can be accompanied by prompts to include with the step when input into the AI model. The prompts can be based on information captured from prior execution, contextual rules, and/or based on feedback provided. Such prompt engineering enables the AI workflow system to produce output to requests with greater accuracy than known approaches.

According to further embodiments, the system 100 and/or engine 104 can include an anonymizer component 120. According to one embodiment, the anonymizer component 120 is configured to process any data input to construct an anonymized version of the input data. In one example, the anonymizer component 120 can be configured to work in conjunction with AI data analysis and automatic code generation functions described above to produce anonymized data as a common format is being generated.

In one example, personally identifiable information can be identified within a data source or a common data format constructed from a variety of sources. The identification of the personally identifiable information can be presented as a step in a workflow, and the user can provide feedback—agreed this is personally identifiable information or disagree, with a request to provide information on why. The feedback then is leveraged to improve workflow step generation.

Code for mappings from source data to a common format version of the data can also be generated to include replacement of personally identifiable information with unique identifiers and/or obscured information. Depending on system settings (which can be set by a client) the common format version of the data can be anonymized by using a unique identifier in place of identifying information. In another example, personally identifiable information can be obscured or altered and the identity can be assigned a unique identifier. In some examples, a workflow step can be presented as to how the data will be obscured, and a feedback request on the operation can be shown in the user interface (e.g., agree, disagree, why, and may also include a request to improve or change the operations). As discussed above, the anonymization workflow step can then be improved by incorporating the feedback into a regeneration of the respective step or task.

According to various embodiments, the client can retain the information linking any unique identifier to any obscured personally identifiable information. In various embodiments, the functionality and components shown in FIG. 2 can be distributed and can operate on systems controlled by clients. In various embodiments, the functionality to produce anonymized data can be executed entirely within the confines of a client system. Complete control over the underlying data and even anonymized data can be retained by the client/client systems. In other embodiments, and for example, based on system settings, both source and common format data can be converted into anonymized data, and clients or client systems can secure the linking information according to their own security preferences, and do so without exposing underlying data to any external systems.

According to one example, the system is configured to identify sensitive data fields. For example, and reference to social security number can be identified (e.g., soc #, social security no., SS #, etc.) and transformed into another value. The another value can be associated with a unique identifier that a client/client system can manage that links the unique identifier to the original information (e.g., via key and id linkage, among other options).

Various embodiments can incorporate any one or more or any combination of the following elements described with outline indents (that can also reflect further refinement of a parent indented feature or additional implementation):

I) TDAA Platform and Applications: optimize How to Interact with AI to generate improved Output (e.g., in targeting, accuracy, and efficiency, with additional options to improve feedback processing to recursively improve the preceding, among other options);
  a. Workflow step generation and optimization (e.g., including context to information generation and use of workflow steps);

II) Define context for interaction with AI—create a Library of Alexandria that host content source, content attribution, content perspective, and manages creation, interactions with, and use of the same;
  a. Interaction Manager Agent
    i. According to one embodiment, the system provides functionality in the form of interaction manager agents to facilitate content capture, content classification, searches for content, and/or content generation. In some examples, the system implements a curator persona (e.g., that can be an AI model) that provides a selectable and specific context to users interacting with the digital library. For example, the system can provide a number of selectable contexts and specific descriptions of the same (e.g., content belongs in a catalog organizing similar content, a catalog can include meta having ______ characteristics, etc.) that enable a user to search for content via abstract metadata, a content section (e.g., organization of content based on ______), content metadata (e.g., having a specific commentator, community validation, specific sentiment, context, etc.), Curator personas can be surfaced by the system within a chat flow interaction with an end user. Users may select a persona based on descriptive characteristics (e.g., based on a specific embedding model, based a body of works by an Author,
  b. Curation Agent;
    i. Curation Agent/Persona are made available within the system as selectable options. The selection of a persona influences the outputs produced or returned by various AI models that use or generate content. In one example, the curation agent/persona is used by the system to create curated lists of content in a content catalog. The lists are developed, for example, by searching the library and then generating new content from the content catalog of content and analysis. Page 1 of Appendix A includes a diagram for this interaction and flow.
    ii. Various embodiments leverage context information, for example, to implement curation agents that can guide content generation and/or retrieval according to an existing or evolving set of context information;
    iii. Interfaces can display description of same, to enable informed selection of context curation for generation and/or retrieval;
  c. Librarian Agent;
    i. In some embodiments, the librarian components are used during the process of adding content to the library. For example, the librarian component is configured to create abstract characteristic for content. Appendix A page 2 provides a diagram and process flow associated with Librarian Agent examples;
  d. Refine context on source data for model(s) to draw on;
    i. Relationship graph to associated content and/or rationale for connection;
    ii. Use rationale information as part of a curator approach;
      1. Librarians build context/commentary information on content;
      2. Automated Curator can deliver contextual results;
        a. Additional training data—retrain model—build new models with context data—as data points—as ingestion information for a source document (possible examples);

b. Refine model with contextual information—fine tuning versus full retrain;

c. Build prompts to guide user interaction based on context;

i. Prompt this commentator not this commentator generated by automated curator;

1. Feedback from workflow specific to current user;

2. Feedback from other workflow interactions—similar to current user;

a. Similarity can be generated by AI models;

b. Similarity scoring (distance), pattern matching, regression analysis, etc.;

c. Similarity in feedback (to other users) in historic data, etc.;

e. Refine training data to build a model/version;

f. Refine training data to fine tune a model/version;

g. Prompt augmentation to include context into user generated prompt;

i. Prompt augments can influence workflow interaction;

h. Interactive session-augmented guided session functionality;

i. Allows user to pick a context (e.g., curator, etc.) as part of search functions that details what the context choices are—avoid bias ______, avoid works by ______, use works by ______, include commentary by ______, influence output with ______ (content creator), artists influenced by ______, artists critical of ______, artists that denigrate ______, musicians influenced by ______, musicians not influences by ______, critical of ______, denigrating ______, etc.: each examples shows the possibilities of defining prompt based constraints that are more generally expressed as perspective information, that can take the form of a logical statement: candidate content returned, sentiment expressed by content analyst (can be curators, AI models, commentators, other content creators, among other options);

1. Produces better outputs, improving accuracy, targeting AND lets user understand what factors are influencing the outputs being produced;

2. Surface perspective/context information associated with respective choices in user interface of curators, librarian, and/or broader preferences—preferences can be dynamically created by the system based on prior interaction: system can express such created preferences to the users, perhaps even identifying preferences that the user has never recognized in themselves or expressed;

ii. Allows selection of specific model—interface details characteristics of models to select from;

iii. Allows selection of embedding data model—;

III) Generic Default Curators;

a. Academic Curator;

i. Heavily Weights academic review of content;

1. Sub-context: Positive commentary;

2. Sub-context: Negative commentary;

ii. Filters out non-academic review of content;

1. Same sub-context;

b. Popular Curator;

i. Weight popular commentary—gauges volume, contemporary timeframe, and/or popularity sentiment;

1. For example—social media content of timeframe given greater preference;

a. Can filter of weight positive/negative subcontext;

ii. Filters out academic and/or artistic (if not popular) review of content;

1. Same sub-context;

c. Artistic Curator;

i. Heavily or weights review of content by other content creators in field;

1. Sub-context: Positive commentary;

2. Sub-context: Negative commentary;

ii. Filters out other review of content;

d. User preferred Curator;

i. Based on historical interaction with content sources—user can opt for content that is reflective of their own perspective or preference;

e. Comparative Search Results Can be Leveraged for Learning;

i. Generate side by side views of output produced by AI model and other curation selection (e.g., selected based on history, similarity, randomly, general search or no curation, etc.);

ii. Include description of perspective that induced changes in output (also educates user on model interaction);

iii. In cases where a context has been selected—a side by side view of results produced without curation provides additional opportunities to ensure the contextual output is appropriately tailored;

1. Interactive Session can solicit user feedback on context output versus other contexts (e.g. academic, artistic, popular, user preference, etc.) and use feedback to further refine curator characteristics, AI model version, etc.;

f. Optional outputs can be produced to show users potential refinements by context/perspective.

Various embodiments implement language models that can be configured to produce a series of steps or a workflow to achieve an output rather than produce a response or output directly. In some examples, this can be achieved via prompt controls provide to the model that specify the request should be broken down into or implemented a series of requests and that the model produce a series of steps to execute. Various embodiments can be configured to require the model to produce a threshold number of steps. Users can interact with these workflow steps and, for example, provide additional input on the respective steps. Such input can be used to update the language models, store and replay prompt data, or various combinations. For example, user input can be used as supervised learning instances for further training of a model. UI prompts for negative examples can be stored and used as prompts in subsequent interactions with the model based on similarity, among other options.

Figure 13:
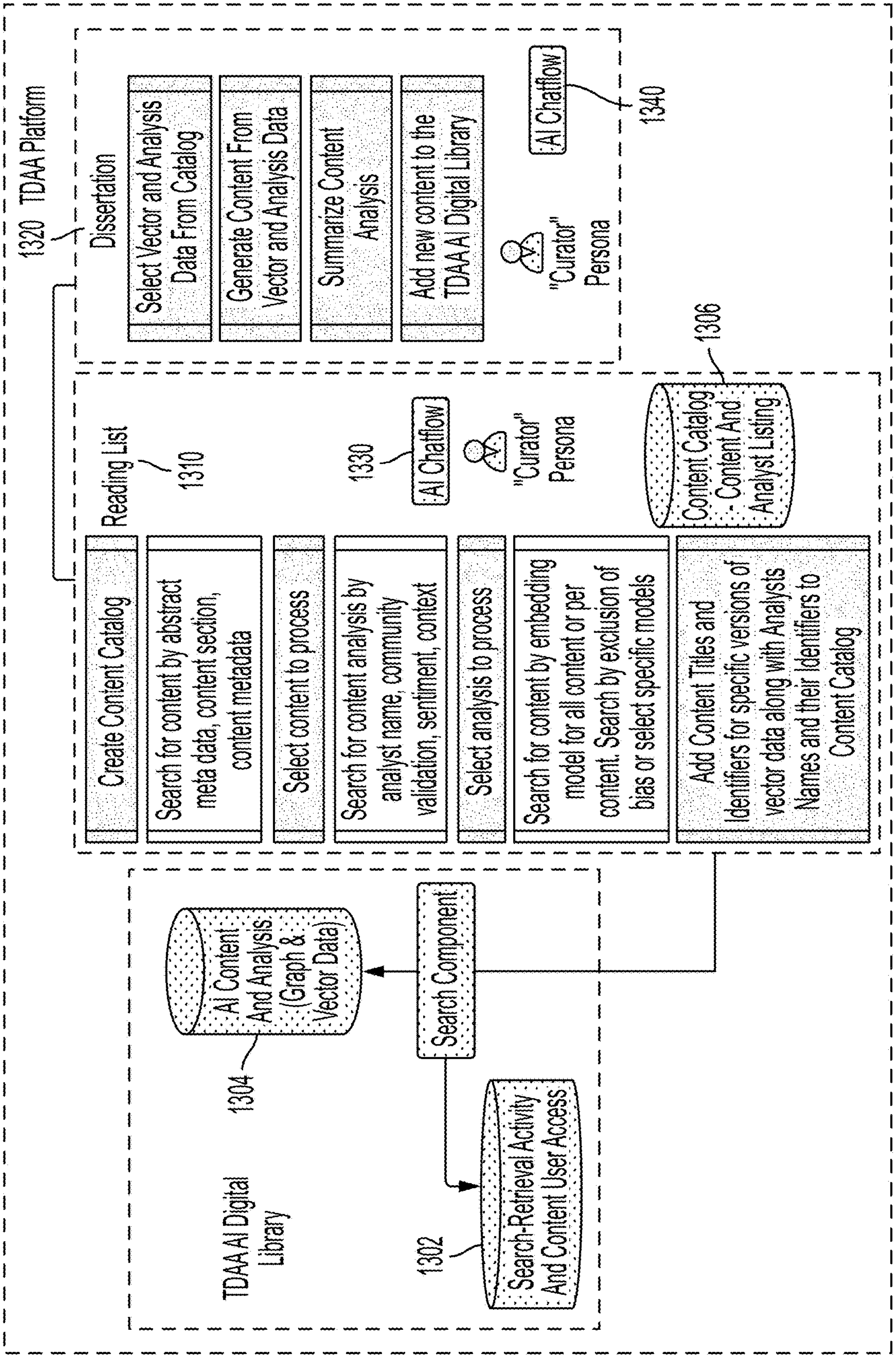
FIG. 13 is an example block diagram of system elements and functionality, according to one embodiment.

FIG. 13 is a block diagram of example system elements and example functionality implemented in various embodiments. FIG. 13 highlights additional or tailored elements that can be used in conjunction with other elements/functionality of the system described herein. For example, FIG. 13 includes illustration of database instances (which can be stored or implemented collectively, separately, distributed, etc.) including search retrieval activity (e.g., at 1302), AI content and analysis database (including for example graph & vector data) (e.g., at 1304), and a content catalog database instance (e.g., 1306). FIG. 13 illustrates functionality that can be provided to support generation and/or updating of tailored reading lists (e.g., at 1310) or in support of generation and/or updating of "dissertation" based functionality (e.g., at 1320). These examples functionalities can be managed or provided through system personas (e.g., 1130 and 1340 implemented by the system that influence outputs generated by respective models.

Figure 14:
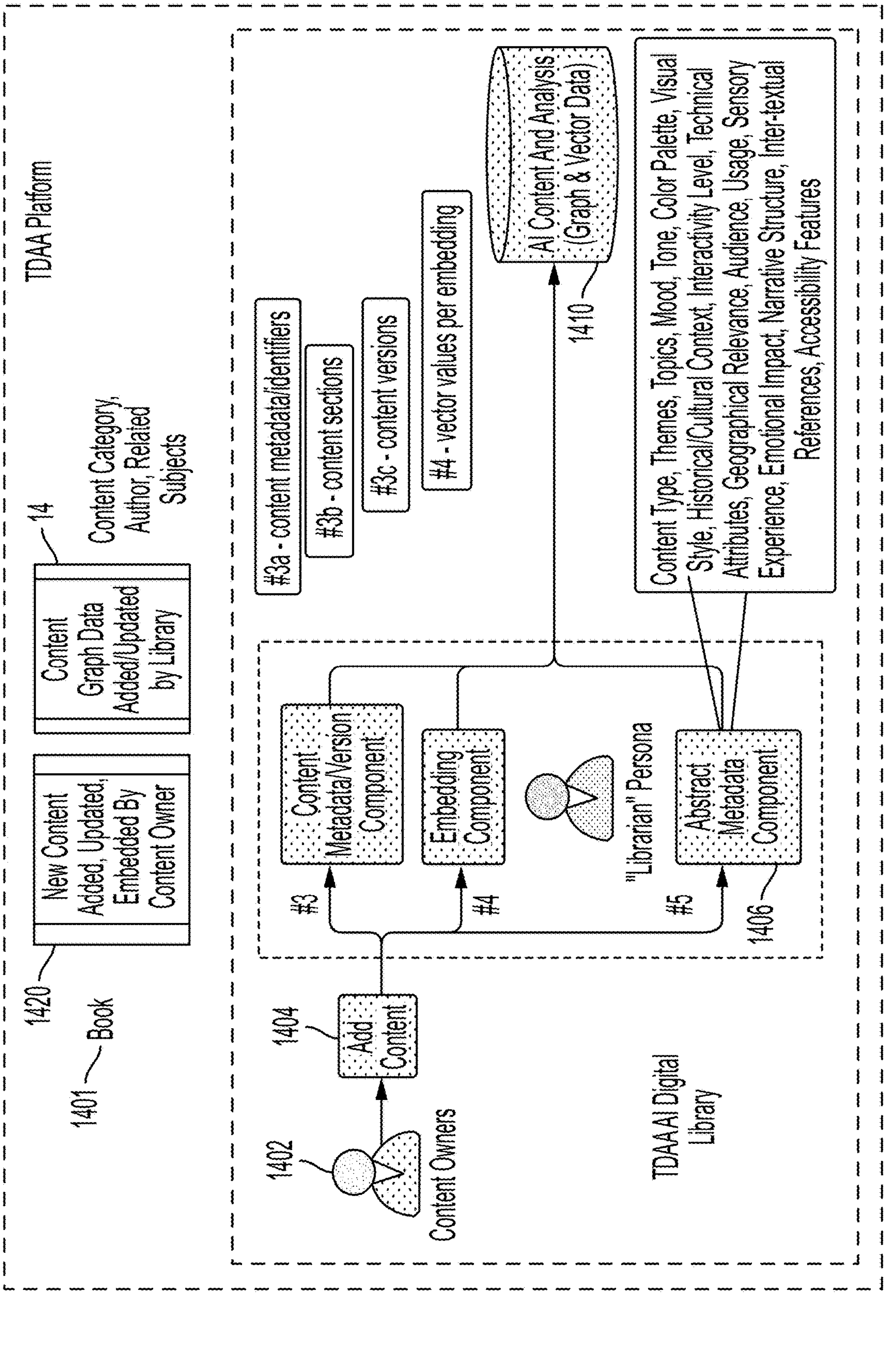
FIG. 14 is an example block diagram of system elements and functionality, according to one embodiment.

FIG. 14 is an example block diagram of system elements and example system operations that expand on example functionality that can be executed by embodiments of the system. FIG. 14 illustrates operations associated with integrating new content into the system for subsequent search and/or curated search operations. Content owners (e.g., 1402) can submit new content (e.g., 1404). The system can invoke persona to manage ingestion of the new content (e.g., 1408—"librarian persona"). At this stage (e.g., 1406) the system can invoke a content metadata/version component to manage metadate creation, versioning, and/or assignment to the new content submission (e.g., a new book 1401. An embedding component or embedding generator transforms newly submitted content into embeddings. In some examples, artificial neural networks are confirmed to produce embeddings from content sources, and the embedding and associated metadate can be linked and/or produced vie a content metadata component and/or abstract metadata component.

The abstract metadata component can be configured to determine an associated abstract metadata from a content input, which can include content type, themes, topics, mood, tone, color palette, visual style, historical/cultural context, interactivity level, technical attributes, geographical relevance, audience, usage, sensory experience, emotional impact, narrative structure, inter-textual references, and or accessibility features, among other options. The metadata, abstract metadata, and embeddings for the new content can be stored in in an AI content database (e.g., 1410—which can include graph based data and vector data).

As shown, the system enables new content to be added or updated for generation of embedding, metadata, and abstract metadata (e.g., shown as a logical level function at 1420). The system can be configured to build graph based data linking any metadata, abstract metadate, and sources of material (e.g., at 1430), among other options. For example, when a content order submits content to the system (e.g., AI digital library) the data is used to generate embeddings (e.g., a vectorized version of the content) which are tailored to use with machine learning models (e.g., large language model (LLM), small language model (SLM), among other machine learning models). In further examples, the content is organized as graphic-based data produced by the AI digital library based on an analysis of the content submitted and obstruction of metadata associated with the content, which can also include abstract metadata associated with the content.

Figure 15:
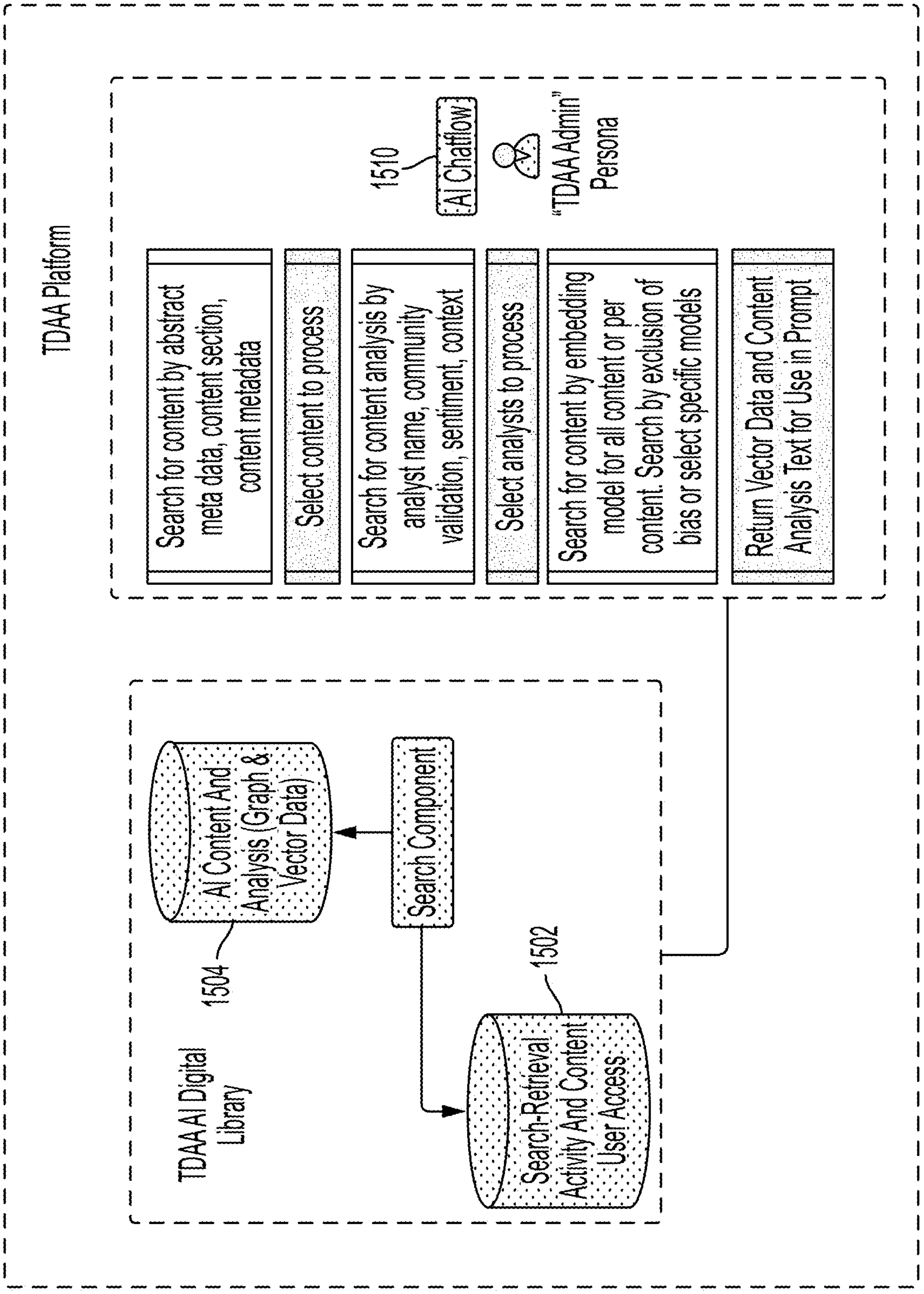
FIG. 15 is an example block diagram of system elements and functionality, according to one embodiment.

FIG. 15 illustrates another embodiment of the system. The various databased of vectorized content and associated information are used by search components to tailor the results either being accessed or being returned, or to control selection of specific models/content that govern what search results are returned to an end user. In various examples, the system provides or manages a chat flow via an AI model that is reflects a person. The personas are tailored to optimized type of interaction and/or functionality. In FIG. 15 an admin persona (e.g., 1510) can be used to govern search retrieval information, capture of the same, and generation of graph based data that can be used to augment the content library (e.g., and associated databases), and guide subsequent search and retrieval operations on a user by user basis as well via model updating and source data expansion/augmentation.

Figure 16:
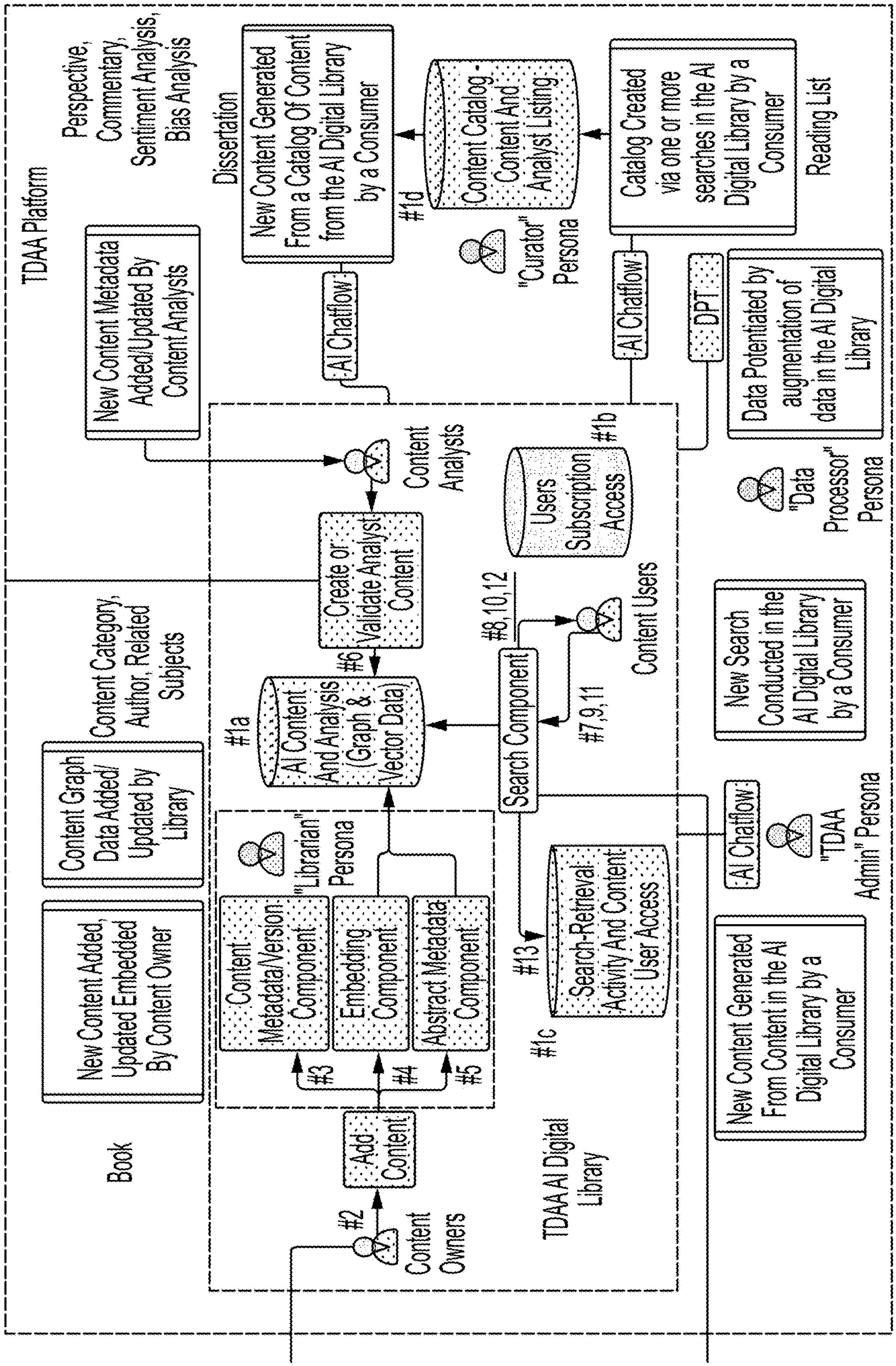
FIG. 16 is an example block diagram of system elements and functionality, according to one embodiment.

FIG. 16 provides a high level walk-through showing example functionality and example interactions between the various system components. For example, in the context of adding new content the illustrative elements can interact with each other and/or be managed by various persona implementations to optimize digital library content. FIG. 16 illustrates the combination of new content addition and subsequent search and retrieval operations and how the various personal and system elements interact. To highlight additional functionality illustrated, content analysts can also interact with the system. According to some embodiments, the content analysts are able to create additional content (e.g. metadata) for individual content submissions. In some examples, analyst metadata can include descriptions of sentiment, attitude, perspective, and provide general commentary on the content source which can be used to assist the system in identifying responsive content and subsequent search processes or is new content added to a prompt for use/input to an LLM guided search session.

Figure 17:
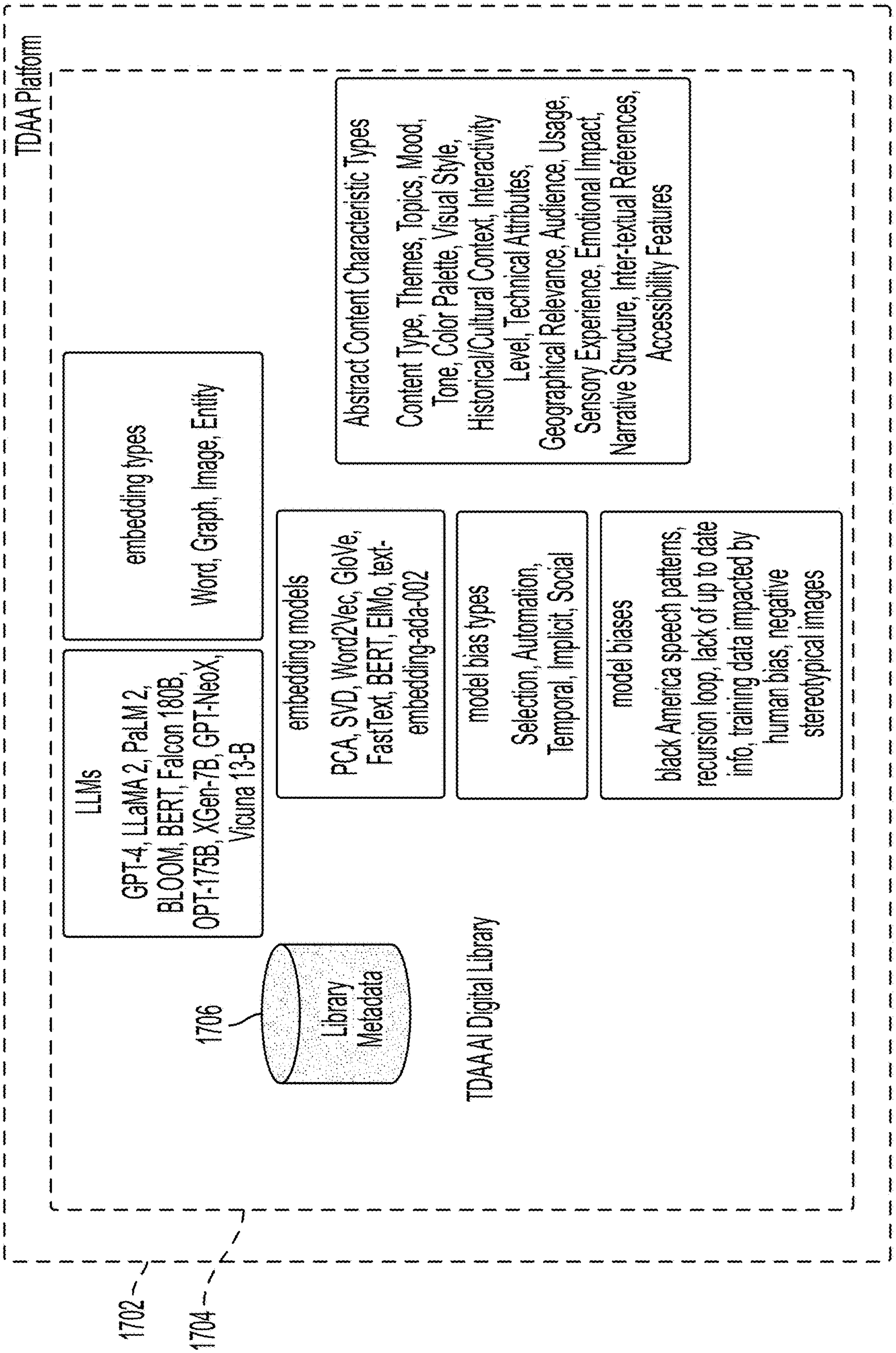
FIG. 17 is an example block diagram of system elements and functionality, according to one embodiment.

FIG. 17 is a block diagram with logical elements and example components according to one embodiment. As shown in FIG. 17 the platform 1702 can manage an AI digital library 1704 that stores searchable content as part of a library and library metadata 1706. The system manages a plurality of flows via a plurality of AR models that enable end users to search and retrieve content according to and/or tailored to their preferences, context, parameters associated with the searchable content, as well as any curated preferences identified or suggested by the system (e.g., via AI curators). As shown in FIG. 17 a variety of components facilitate these functions. For example, LLMs can be used to manage flows with end users during interactive sessions. Examples of the LLM's being employed on the system include GPT4, LlaMA 2, PaLM 2, BLOOM, BERT, Falcon 180B, OPT-175B, XGen-7B, GPT-NeoX, Vikuna 13-B, among other options. In further example, the system is configured to build vectorized data or embedding's from submitted content. In some examples, the system produces various embedding types that are based on word, graph, image, and/or entity data. According to one embodiment, the system can instantiate a plurality of embedding models which include for example PCA, SVD, Word2Vec, GloVe, FastText, BERT, EIMo, text-embedding-ada-002, among other options. As discussed the system especially configured to handle bias and search operations which can include managing information on model bias types. For example, the models bias types can include selection bias, automation bias, temporal bias, implicit bias, and/or social bias, among other options.

Some examples of bias data can be included and used during search and retrieval operations include black American speech patterns, recursion loop, lack of up-to-date information, training data impacted by human bias, negative stereo typical images, among a host of other options. In further embodiments, abstract metadata is leveraged by the system to manage various functions. The abstract metadata can include for example abstract content characteristic types. Examples of abstract content characteristic types include content type, themes, topics, mood, tone, color palette, visual style, historical/cultural context, interactivity level, technical attributes, geographical relevance, audience, usage, sensory experience, emotional impact, narrative structure, inter-textual references, accessibility features, among other options.

Figure 18:
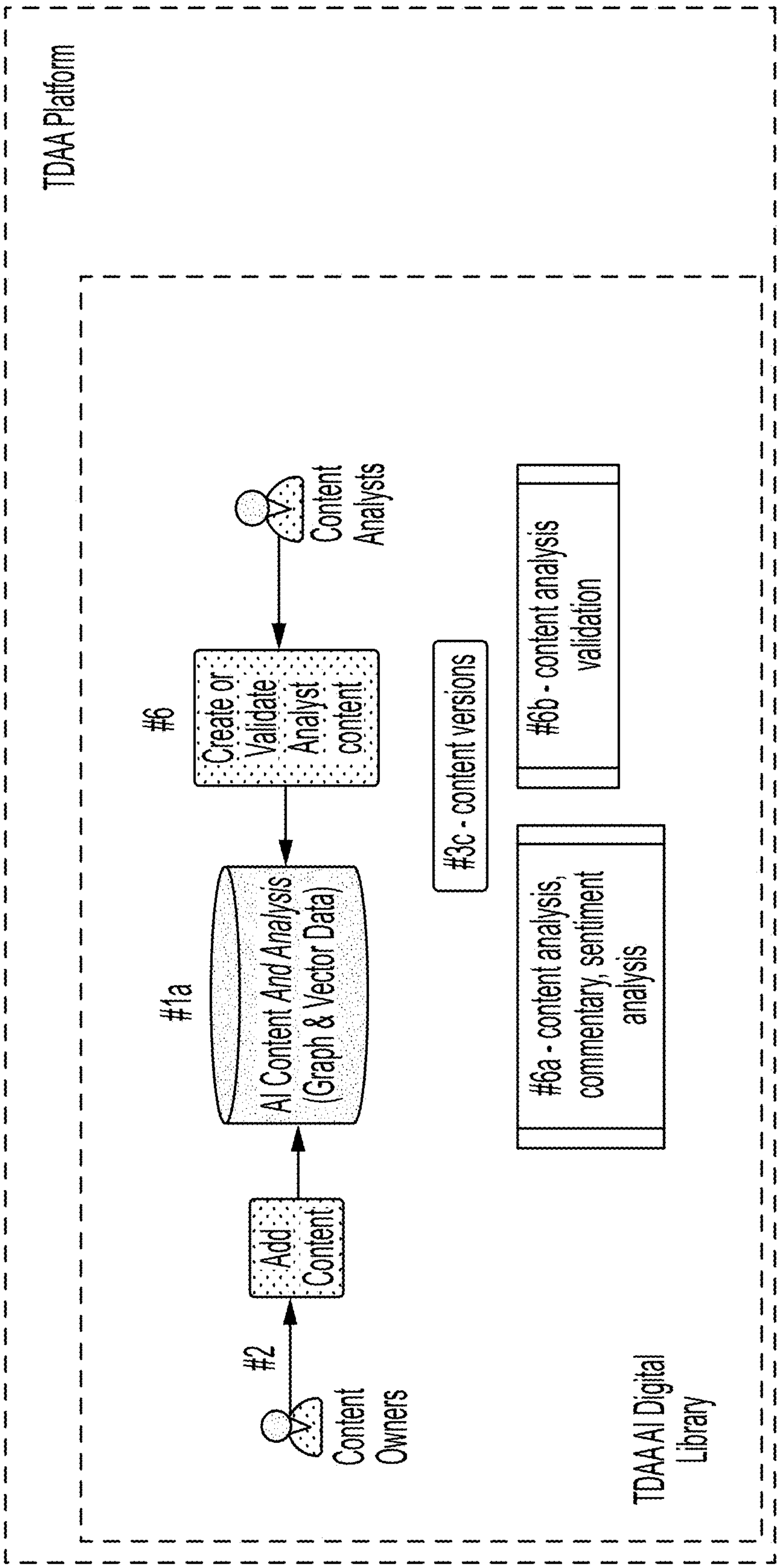
FIG. 18 is an example block diagram of system elements and functionality, according to one embodiment.

FIG. 18 is a block diagram of an example system elements and interactions according to one embodiment. As shown, the system enables content and analysis to be generated and incorporated into the digital library via content analyst users, among other options. According to one example, content analysts are able to create additional content metadata for individual content submissions, content groups, categories, among other options. For example, content analysts can create content metadata such as content that describes sentiment, attitude, perspective, general commentary, among other options. This information can be recorded in a graph-based data structure preserving linkages in and among the metadata and/or abstract metadata. This information can then be used to manage information retrieval and for example to add to a prompt for use with a chat flow and a high model.

Figure 19:
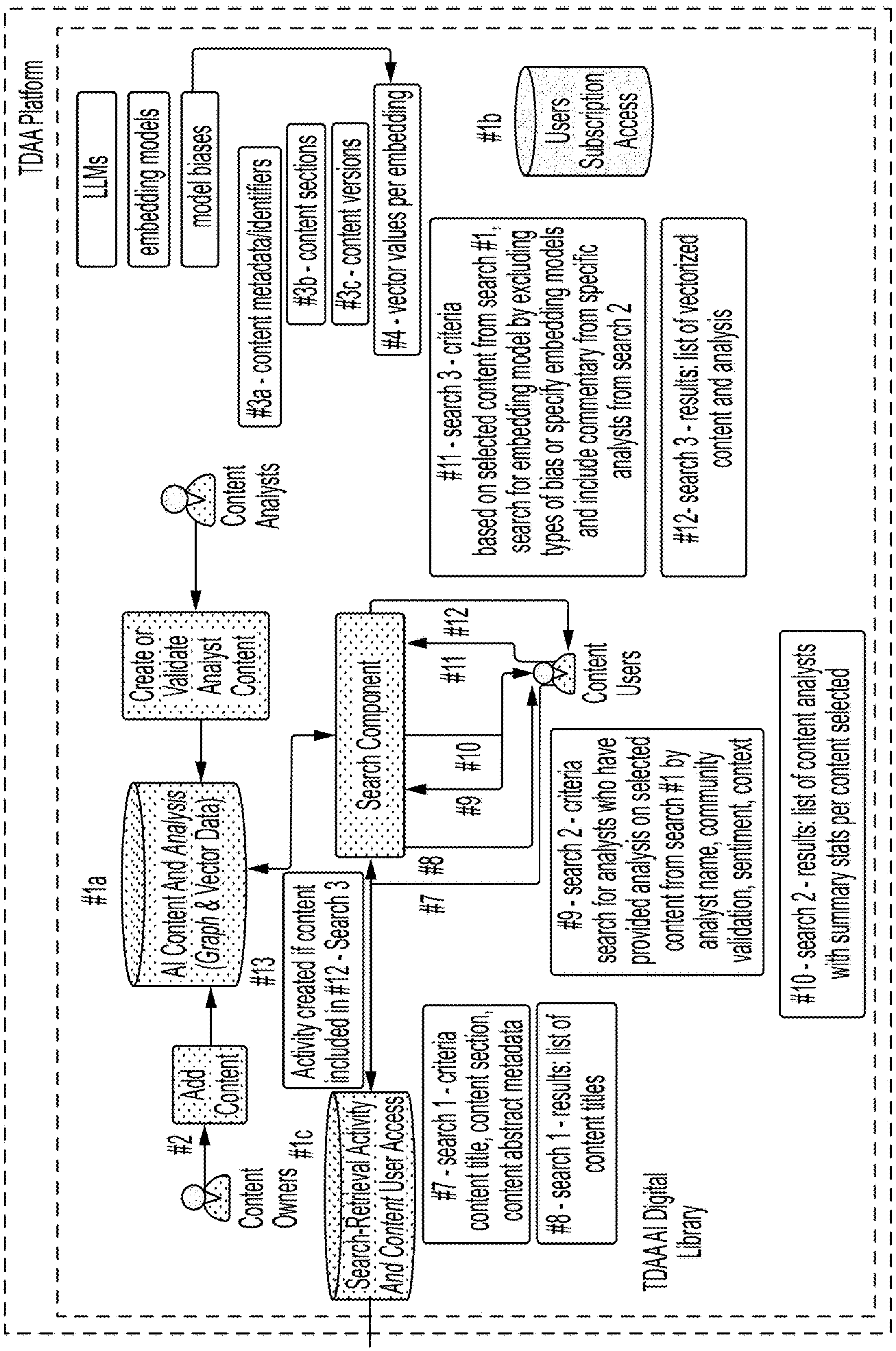
FIG. 19 is an example block diagram of system elements and functionality, according to one embodiment.

FIG. 19 is a block diagram of an example system, system elements, and system interactions, according to embodiments. As shown in FIG. 19, the system includes district component configured to search and scan content in a digital library which includes content identifiers as part of the search results. According to one embodiment, the resulting identifiers returned are maintained in a database associated with the digital content or included in the database with digital content and can be used to capture information on the user who requested a split specific search in addition to the identifiers of the content that were searched. Maintaining this data allows the system to optimize attribution and even ensure copyright owners are identifiable and vectorized content being used or incorporated into outputs produced by AI models.

Figure 20:
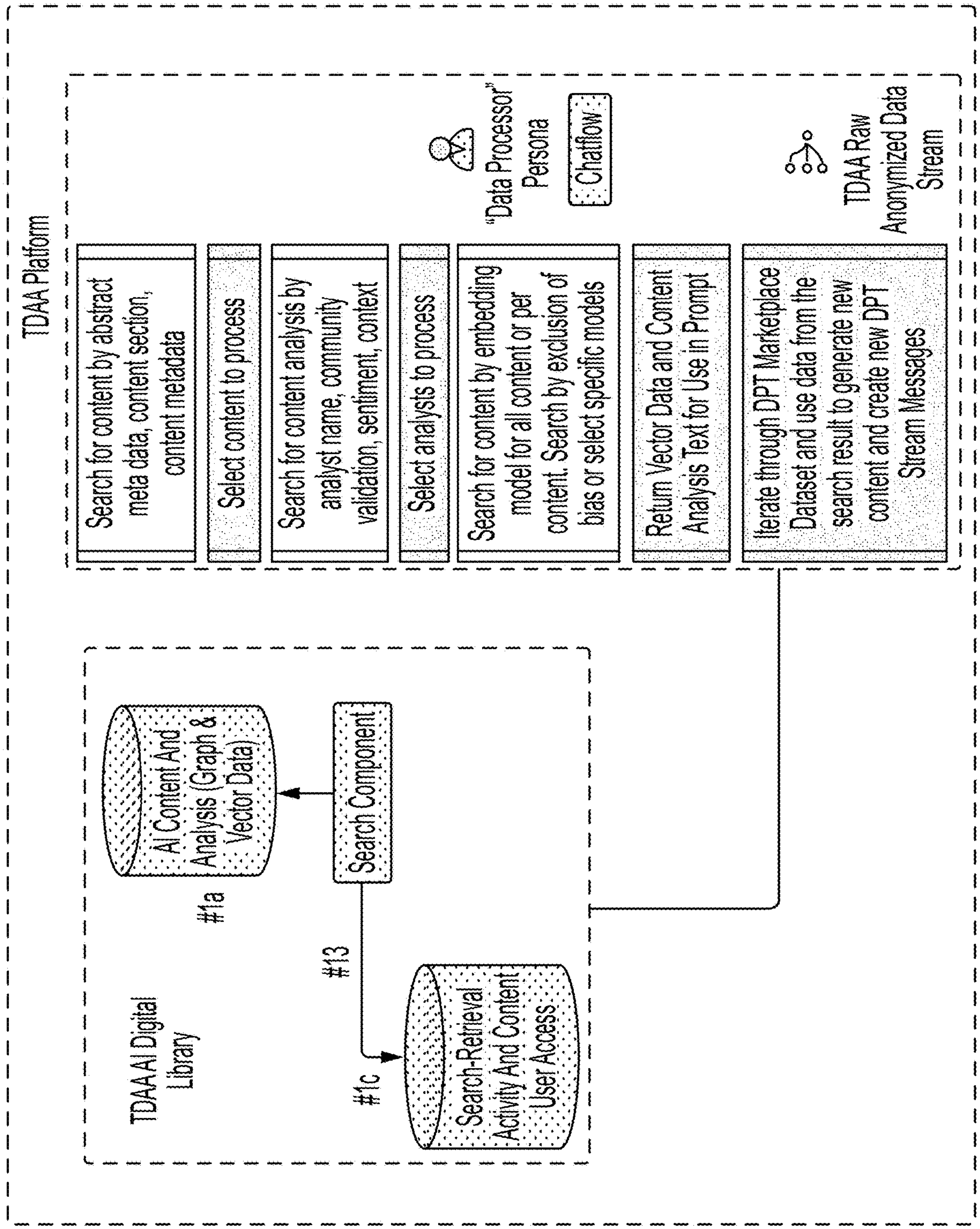
FIG. 20 is an example block diagram of system elements and functionality, according to one embodiment.

FIG. 20 is a block diagram of an example system, system elements, and system interactions according to one embodiment. As shown in FIG. 20, the system can provide search functionality that is tailored to respective personas implemented as AI models. According to one embodiment, a persona/AI model can manage the chat flow with a user according to specific preferences associated with the persona. In this example a data processor persona is specifically tailored to manage and optimize data management tasks on behalf of the end user.

The terms “program” or “software” are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationships between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described herein) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

In other embodiments, various ones of the functions and/or portions of the flows discussed herein can be executed in different order. In still other embodiments, various ones of the functions and/or portions of the flow can be omitted, or consolidated. In yet other embodiments, various ones of the functions and/or portions of the flow can be combined, and used in various combinations of the disclosed flows, portions of flows, and/or individual functions. In various examples, various ones of the screens, functions and/or algorithms can be combined, and can be used in various combinations of the disclosed functions.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

All definitions, as defined and used herein, should be understood to control over dictionary definitions, and/or ordinary meanings of the defined terms. As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system comprising at least one processor operatively connected to a memory, the at least one processor when executing configured to:

generate and display an interactive session for managing interaction with at least a first artificial intelligence ("AI") model;

accept a user input specifying at least some of a request to be processed by the first AI model, the request indicating a plurality of data sources and a data management operation to be executed by the at least one processor to retrieve data from the plurality of data sources;

accept specification of a context to evaluate or constrain output produced by the first AI model;

generate a modification or update or augmentation of an input to the first AI model based on context information associated with the specified context or select a version of the first AI model associated with the specified context or select a curator agent associated with the specified context; and optimize generation of a final output of the first AI model to communicate and present in a user interface displaying the interactive session, wherein the final output is configured to execute the data management operation by generating, based on at least one constraint associated with the specified context, a mapping between the plurality of data sources indicated by the request and a canonical data format.

2. The system of claim 1, wherein the at least one processor is configured to display, as part of the interactive session, information describing the specified context which can optionally include display options for available contexts that modify outputs produced by the first AI model.

3. The system of claim 1, wherein the at least one processor is configured to display a plurality of default contexts and description of an effect on the output each respective default induces.

4. The system of claim 1, wherein the at least one processor is configured to display a plurality of outputs associated with the user input specifying at least some of the request, each output associated with a respective context, description of the context, in displays for evaluating empirically changes in output based on the described context.

5. The system of claim 1, wherein the at least one processor is configured to accept a user input specifying the context.

6. The system of claim 1, wherein the at least one processor is configured to automatically define the context.

7. The system of claim 1, wherein the at least one processor is configured to generate workflow steps as part of the generation of the final output of the first AI model to communicate and present in the user interface displaying the interactive session.

8. The system of claim 7, wherein the at least one processor is configured to modify or update or augment creation of respective workflow steps based at least in part on the context.

9. The system of claim 8, wherein the at least one processor is configured to modify or update or augment creation of respective workflow steps based at least in part on the context by generating additional inputs to any AI model configured to generate the respective workflow steps.

10. The system of claim 1, wherein the at least one processor is configured to employ definition of context to update an input provided to the first AI model to require generation of a threshold number of workflow steps.

11. A computer implemented method comprising:

generating and displaying, by at least one processor, an interactive session for managing interaction with at least a first artificial intelligence "AI" model;

accepting, by the at least one processor, a user input specifying at least some of a request to be processed by the first AI model, the request indicating a plurality of data sources and a data management operation to be executed by the at least one processor to retrieve data from the plurality of data sources;

accepting, by the at least one processor, specification of a context to evaluate or constrain output produced by the first AI model;

generate a modification or update or augmentation of an input to the first AI model based on context information associated with the specified context or select a version of the first AI model associated with the specified context or select a curator agent associated with the specified context; and optimize generation of a final output of the first AI model to communicate and present in a user interface displaying the interactive session, wherein the final output is configured to execute the data management operation by generating, based on at least one constraint associated with the specified context, a mapping between the plurality of data sources indicated by the request and a canonical data format.

12. The method of claim 11, wherein the method comprises displaying, as part of the interactive session, information describing the specified context which can optionally include display options for available contexts that modify outputs produced by the first AI model.

13. The method of claim 11, wherein the at least one processor is configured to display a plurality of default contexts and description of an effect on the output each respective default induces.

14. The method of claim 11, wherein the method comprises displaying a plurality of outputs associated with the user input specifying at least some of the request, each output associated with a respective context, description of the context, in displays for evaluating empirically changes in output based on the described context.

15. The method of claim 11, wherein the method comprises:

accepting a user input specifying the context; or automatically defining the context.

16. The method of claim 11, wherein the method comprises:

generating workflow steps as part of the generation of the final output of the first AI model; and presenting the workflow steps and associated outputs in the user interface displaying the interactive session.

17. The method of claim 16, wherein the method comprises modifying or updating or augmenting creation of respective workflow steps based at least in part on the context.

18. The method of claim 17, wherein the method comprises modifying or updating or augmenting creation of respective workflow steps based at least in part on the context by generating additional inputs to any AI model configured to generate the respective workflow steps.

19. The method of claim 11, wherein the method comprises employing definition of context to update an input provided to the first AI model to require generation of a threshold number of workflow steps.

20. The system of claim 1, wherein the at least one processor when executing is configured to:

select the curator agent associated with the specified context by accepting, via the interactive session, selection of the curator agent from among a plurality of curator agents, wherein:

each of the plurality of curator agents is associated with a respective perspective or bias characteristic; and each of the perspective or bias characteristics specifies weighting or selection of candidate content available for use by the first AI model; and use the selected curator agent to generate, from the candidate content available for use by the first AI model, a constrained output set, comprising:

weighting at least a portion of the candidate content based on a perspective characteristic associated with the selected curator agent; or excluding at least a portion of the candidate content based on a bias characteristic associated with the selected curator agent, wherein optimizing generation of the final output of the first AI model comprises generating the final output of the first AI model based on the constrained output set.

* * * * *